US011210501B2

(12) United States Patent
Hodge et al.

(10) Patent No.: US 11,210,501 B2
(45) Date of Patent: Dec. 28, 2021

(54) CAMERA ENHANCED RIDE SHARING

(71) Applicant: Xirgo Technologies, LLC, Camarillo, CA (US)

(72) Inventors: Andrew Hodge, Palo Alto, CA (US); Nathan Ackerman, Palo Alto, CA (US); Jean-Paul Labrosse, Palo Alto, CA (US); Phillip Lucas Williams, Palo Alto, CA (US); Scott Lindsay Sullivan, Palo Alto, CA (US); Jason Matthew Alderman, Palo Alto, CA (US)

(73) Assignee: XIRGO TECHNOLOGIES, LLC, Camarillo, CA (US)

( * ) Notice: Subject to any disclaimer, the term of this patent is extended or adjusted under 35 U.S.C. 154(b) by 24 days.

(21) Appl. No.: 16/957,060

(22) PCT Filed: Jan. 2, 2019

(86) PCT No.: PCT/US2019/012051
§ 371 (c)(1),
(2) Date: Jun. 22, 2020

(87) PCT Pub. No.: WO2019/136066
PCT Pub. Date: Jul. 11, 2019

(65) Prior Publication Data
US 2020/0349345 A1    Nov. 5, 2020

Related U.S. Application Data

(60) Provisional application No. 62/612,958, filed on Jan. 2, 2018.

(51) Int. Cl.
*G06K 9/00* (2006.01)
*G06Q 10/06* (2012.01)
*H04N 5/247* (2006.01)

(52) U.S. Cl.
CPC ..... *G06K 9/00288* (2013.01); *G06K 9/00771* (2013.01); *G06K 9/00791* (2013.01);
(Continued)

(58) Field of Classification Search
CPC .......... G06K 2209/15; G06K 9/00288; G06K 9/00295; G06K 9/00302; G06K 9/00771;
(Continued)

(56) References Cited

U.S. PATENT DOCUMENTS

2011/0093193 A1    4/2011  Huang et al.
2015/0169946 A1    6/2015  Needleman
(Continued)

FOREIGN PATENT DOCUMENTS

WO    WO-2015089207 A1 *  6/2015    ......... G06Q 10/0834

OTHER PUBLICATIONS

International Application No. PCT/US2019/012051, International Search Report and Written Opinion dated Jun. 6, 2019, 6 pages.
(Continued)

*Primary Examiner* — Nathnael Aynalem
(74) *Attorney, Agent, or Firm* — Marton Ribera Schumann & Chang LLP; Chien-Ju Alice Chuang; Hector J. Ribera

(57) ABSTRACT

In a system for video data capture and sharing client devices may include one or more video cameras and sensors to capture video data and to generate associated metadata. A cloud-based component may receive metadata from the client devices and requests for sharing video data captured by other client devices. The system can be used to implement a ridesharing method to connect a rider to a driver. Information about the driver and rider is accessed when a driver accepts a ridesharing request. Camera devices in the pickup area can detect the license plate of the driver's vehicle to confirm its arrival and a client device in the
(Continued)

vehicle can facially recognize the driver at the wheel. Similarly, the location of the rider in the pickup area can be verified, for example through a face recognition scan. Once both driver and rider are verified, they are notified of their presence in the pickup area and linked, for example by identifying the rider in an augmented reality display in the driver's vehicle and by displaying an image of the rider on a side-facing display.

20 Claims, 11 Drawing Sheets

(52) U.S. Cl.
CPC ... *G06K 9/00832* (2013.01); *G06Q 10/06311* (2013.01); *H04N 5/247* (2013.01); *G06K 2209/15* (2013.01)

(58) Field of Classification Search
CPC ........... G06K 9/00791; G06K 9/00832; G06Q 50/30; G06Q 10/06311; H04L 2209/84; H04L 9/3273; H04L 9/3231; H04L 63/0861; H04W 12/06; H04W 12/68; H04W 4/40
USPC .................................................. 348/77, 148
See application file for complete search history.

(56) References Cited

U.S. PATENT DOCUMENTS

| | | | |
|---|---|---|---|
| 2016/0027079 A1* | 1/2016 | Schoeffler | G06Q 30/0609 705/325 |
| 2016/0364678 A1 | 12/2016 | Cao | |
| 2017/0127215 A1 | 5/2017 | Khan | |
| 2018/0096445 A1* | 4/2018 | Eyler | G06Q 10/02 |

OTHER PUBLICATIONS

European Application No. EP19735931.8, Extended European Search Report dated Dec. 8, 2020, 7 pages.

* cited by examiner

VIDEO DATA OBJECT
620

| |
|---|
| deviceId 621 |
| timestamp 622 |
| gpsTimestamp 623 |
| latitude 624 |
| longitude 625 |
| altitude 626 |
| speed 627 |
| heading 628 |
| horizontalAccuracy 629 |
| verticalAccuracy 630 |
| swVersion 631 |
| geoHash 632 |
| connectionType 633 |
| signalStrengthBarCount 634 |
| carrierName 635 |

Fig. 6b

VIDEO CLIP EVENT OBJECT
650

| |
|---|
| deviceId 651 |
| timestamp 652 |
| geoHash 653 |
| tagId 654 |
| tagType 655 |
| tagTitle 656 |
| tagLatitude 657 |
| tagLongitude 658 |
| tagAltitude 659 |
| tagSpeed 660 |
| tagHeading 661 |
| tagHorizontalAccuracy 662 |
| tagVerticalAccuracy 663 |
| tagFullVideoFileName 664 |
| TagSwVersion 665 |
| tagDeviceTypeId 666 |
| isTag (viewed 667a, shared 667b, deleted 667c, ...) |

Fig. 6c

CAMERA ENHANCED RIDE SHARING

CROSS-REFERENCE TO RELATED APPLICATIONS

The present application is a national phase entry under 35 U.S.C. § 371 of International Patent Application No. PCT/US19/12051 titled "Camera Enhanced Ride Sharing," filed on Jan. 2, 2019, published in English, which claims priority to U.S. Provisional Patent Application No. 62/612,958 filed on Jan. 2, 2018, and is related to International Patent Application No. PCT/US17/50991, entitled "Video-Based Data Collection, Image Capture and Analysis Configuration," filed Sep. 11, 2017, which claims the benefit of U.S. Provisional Patent Application No. 62/412,764, filed Oct. 25, 2016, all of which are incorporated herein by reference in their entirety.

BACKGROUND

This disclosure generally relates to video-based data collection systems, and more specifically to an image, video, and sensor data capture, storage, transmission, and analysis for ride sharing applications.

With the wide adoption of smartphones and our ubiquitous connectivity to the Internet and social networks, software apps and cameras have become common place in our daily lives for personal applications. We take pictures and videos with our smartphones of all sorts of events, items, and situations, and easily upload to cloud services and share them with friends, family, and other people who subscribe or follow our shared content.

One area where cameras are being used is in vehicles. Safety cameras for backing up or side view cameras are becoming common-place. For commercial vehicles, like taxis or other vehicle fleets, security camera systems record video from both inside and outside the vehicle for safety and management purposes. For example, Safety Track of Belleville, Mich., provides a 2-channel dash camera system equipped with a 3G/4G cellular dongle that connects to the camera system via USB for streaming video from the vehicle in real time (described at http://www.safetytrack.net/dual-lens-in-vehicle-fleet-camera-system/). However, these in-vehicle systems are not simple to install for an average consumer and lack any video sharing capabilities with other systems and do not automatically tag and share events.

In-vehicle cameras are also present in ride sharing vehicles. However, as rideshare services, such as Uber, Lyft, and similar services, increase in popularity, difficulties in connecting the driver with the customer at the point of pickup have also increased. It is a communication issue. These difficulties in communication have become apparent in areas where crowds commonly form, such as movie theaters, bus stations, malls, and convention halls and where the density of rideshare services are high.

To illustrate a common problem in connecting a rideshare driver with a rideshare customer, a woman located at an airport has just arrived from a trip and requests a rideshare driver using her smartphone and a relevant software application. A driver accepts the pickup request and drives to her location. The problem becomes apparent as the driver approaches the pickup location and is welcomed by a crowd of people, many of whom are also waiting to be picked up by a taxicab, another rideshare driver, or perhaps a family member. As the driver slowly drives by the crowd, frustration ensues as the actual customer tries to identify her driver and vice versa. At times pickup lanes are 3-5 lanes deep (convention centers and other large venues). A passenger searching for a driver can encounter many similar cars and have difficulty reading license plates among the chaotic cluster of vehicles.

There have been attempts to provide an illuminated panel in the driver's car which would illuminate in a specific color. The color would match a similar color displayed on the customer's smartphone. The customer would only have to match her color with the different displays shown by the different rideshare cars as they pass by. Unfortunately, this seemingly elegant solution was often met with frustration in use because the colored panels located in the drivers' cars were very difficult to see during the day and are only found in a very small number of participating vehicles and routinely unplugged as the drivers control and can potentially lose charging cable. Furthermore, customers with color-blindness will experience difficulty, for obvious reasons. Regardless, when a customer enters a rideshare car, there is often a level of apprehension because both the driver and the customer are still not certain that they are meant to be connected. The driver must ask the passenger's name, but the passenger could be lying, just to get a free ride from the airport to the city on someone else's account. Similarly, the passenger may not be certain that the driver is the true driver who is registered with the rideshare company. Without confirmation, her level of comfort and safety will be challenged.

What is needed is a ride sharing system that uses in-vehicle and user mobile device cameras to addresses the deficiencies of the prior art.

BRIEF SUMMARY

According to various embodiments of the present invention, a video data collection and sharing platform is provided.

In one embodiment, a cloud-based system for video data capture and sharing comprises a plurality of client devices. Each client device may include one or more video cameras, one or more sensors, a processor, memory, and a cellular communication module. The client device may preferably be configured to capture video data and to generate metadata associated with the video data. The metadata may preferably include, at least in part, data derived from the one or more sensors. The cloud-based system may at times be in communication with the plurality of client devices and may be configured to receive metadata from the plurality of client devices when connected. It may additionally be configured to receive requests from client devices for sharing video data captured by other client devices from the plurality of client devices. The cloud-based system may be also configured to identify one or more client devices by matching the metadata from a subset of the plurality of client devices to a request, sending to the subset of client devices an image search query for an object of interest specified in the request, and receiving a positive match response from the one or more client devices indicating that the object of interest is found in the video data captured by the one or more identified client devices. In some embodiments, the one or more sensors may include one or more of a location sensor, an accelerometer, a gyroscope, a magnetometer, a light sensor, a gravity sensor, a geomagnetic field sensor, a linear acceleration sensor, a rotation vector sensor, a significant motion sensor, a step counter sensor, or a step detector sensor. Optionally, in one embodiment, one or more client devices may be dash-mounted camera devices mounted on moving vehicles and other client devices are fixed camera devices mounted on fixed structures. In some embodiments, the system may also optionally include a mobile device configured to establish a data communication with a client device to receive video data from the client device.

According to other embodiments, a cloud-based system for video data capture and sharing is provided. The cloud-based system may include a mobile vehicle-mounted client device comprising one or more video cameras, one or more sensors, a processor, memory, and a cellular communication module. The client device may be configured to capture video data from a moving vehicle and to generate metadata associated with the video data, including, at least in part, data derived from the one or more sensors. The system may also include a mobile device comprising a touchscreen and a wireless communication module. The mobile device may be configured to display on the touchscreen a listing of video clips available for playback by the mobile device. The cloud-based system may communicate with the mobile vehicle-mounted client device via a cellular data connection, and with the mobile device via a wireless connection to the Internet. The cloud-based system provides a ridesharing communication system that provides real-time facial details of both a rideshare driver and customer at the time of pickup. In embodiments, a method for connecting a rideshare driver with a rideshare rider at a point of pickup includes accessing rider information regarding a rideshare rider requesting a rideshare driver, the rider information including (i) rider location information indicating a pickup area comprising one or more camera devices and (ii) a rider facial recognition profile. The method may further include receiving a request response from the rideshare driver, the rideshare driver being associated with a vehicle having a license plate and a driver face recognition profile. The method may also include monitoring a location of the vehicle associated with the rideshare driver to determine an arrival at the pickup area. Upon determining the arrival at the pickup area, the method includes scanning with the one or more camera devices license plate information from vehicles in the pickup area to confirm the license plate associated with the rideshare driver vehicle. Further, upon confirming the license plate associated with the rideshare driver vehicle with the one or more cameras in the pickup area, the method includes verifying the rideshare driver using a second camera device within the rideshare driver vehicle and the face recognition profile of the rideshare driver. Also, upon verifying the rideshare driver, the method may notify the rideshare rider that the rideshare driver has arrived at the pickup area and request a facial scan from the rideshare rider. The method then may verify the rideshare rider based on the facial scan and the accessed rider facial recognition profile and upon verifying the rideshare rider, the method includes notifying the rideshare driver that the rideshare rider is present at the pickup area. Finally, the method links the rideshare driver and the rideshare rider. In embodiments, the one or more camera devices may be auxiliary client devices of a cloud-based camera network and the second camera device may be a client device of a cloud-based camera network. In embodiments, the client device may comprise face recognition software or may transmit an image of the face of the rideshare driver to the cloud-based system for comparison with the face recognition profile of the rideshare driver, or both.

In embodiments, the second camera device may comprise a front-facing camera and an augmented reality display. In these embodiments, the linking of the rideshare driver and the rideshare rider may include identifying the rideshare driver in a live video stream of the pickup area from the front-facing camera displayed in the augmented reality display.

In some embodiments, the rider location information includes information derived from one of RF beacons or face recognition information from images collected by the one or more camera devices in the pickup area.

In embodiments, the rideshare driver vehicle comprises a secondary display facing out of the vehicle and further wherein the linking the rideshare driver and the rideshare rider includes displaying a picture of the rideshare rider on the secondary display.

In embodiments, the facial scan requested from the rideshare rider is provided via the one or more camera devices in the pickup area. In other embodiments it is provided via a mobile app in a smartphone of the rideshare rider.

In embodiments, a system for connecting a rideshare driver with a rideshare rider at a point of pickup is also provided. The system may include one or more processors and non-transitory computer readable media comprising instructions that when executed by the one or more processors configure the system to perform the methods for connecting a rideshare driver with a rideshare rider at a point of pickup.

BRIEF DESCRIPTION OF THE SEVERAL VIEWS OF THE DRAWINGS

FIG. 6b illustrates a data model for capturing metadata associated with a given video data object or file according to one embodiment.

FIG. 6c illustrates a data model for capturing metadata associated with a given event-based video clip according to one embodiment.

The figures depict various example embodiments of the present disclosure for purposes of illustration only. One of ordinary skill in the art will readily recognize form the following discussion that other example embodiments based on alternative structures and methods may be implemented without departing from the principles of this disclosure and which are encompassed within the scope of this disclosure.

DETAILED DESCRIPTION

The Figures and the following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments, examples of which are illustrated in the accompanying figures.

The above and other needs are met by the disclosed methods, a non-transitory computer-readable storage medium storing executable code, and systems for streaming and playing back immersive video content.

Figure 1:
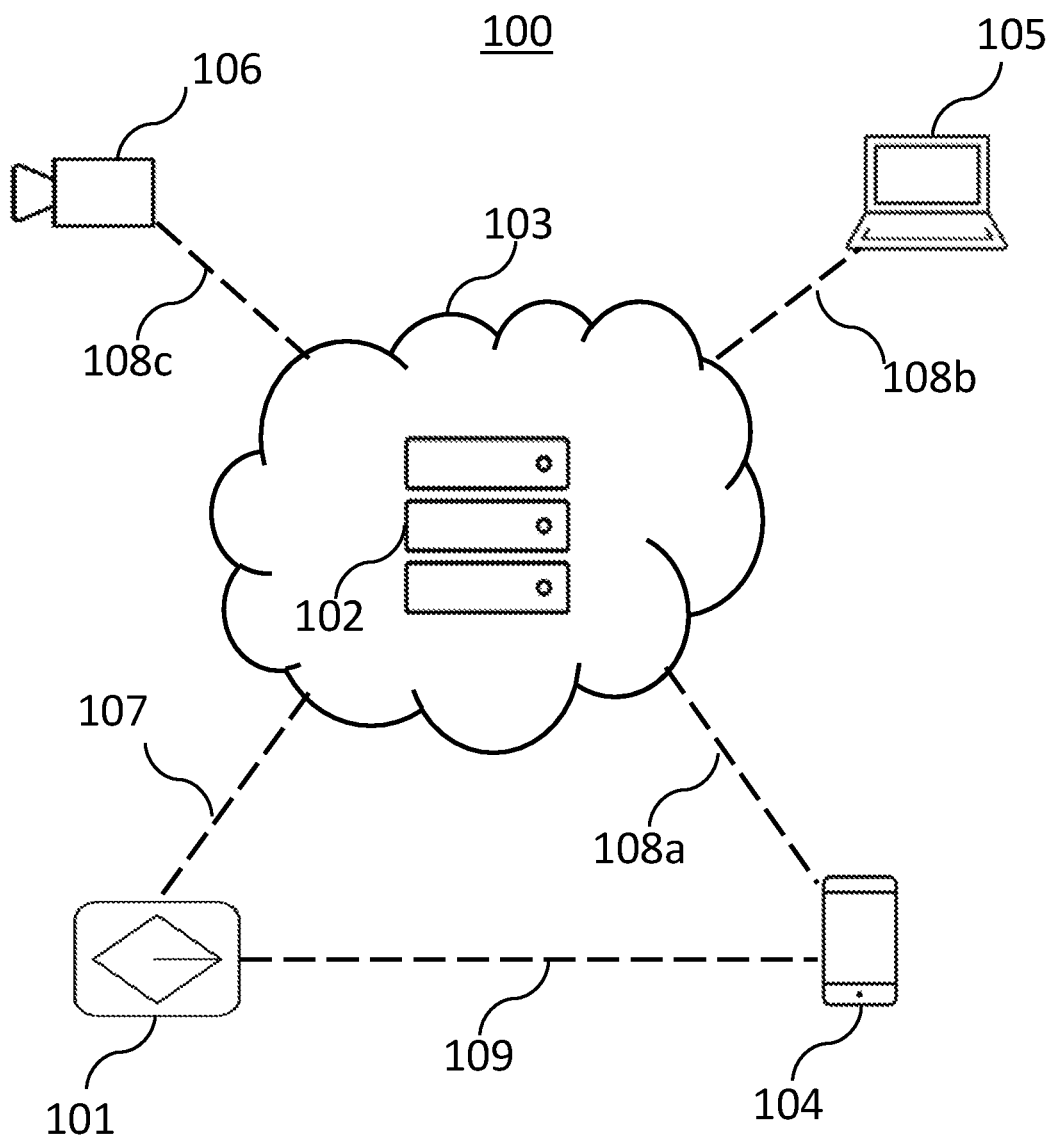
FIG. 1 illustrates an exemplary video-based data capture and analysis system according to embodiments of the disclosure.

Referring now to FIG. 1, an exemplary vehicular video-based data capture and analysis system 100 according to one embodiment of the disclosure is provided. Client device 101 is a dedicated data capture and recording system suitable for installation in a vehicle. In one embodiment, client device 101 is a video-based dash camera system designed for installation on the dashboard or windshield of a car. Client device 101 is connected to cloud-based system 103. In one embodiment, cloud-based system 103 includes a server system 102 and network connections, such as for example, to Internet connections. In one embodiment, cloud-based system 103 is a set of software services and programs operating in a public data center, such as an Amazon Web Services (AWS) data center, a Google Cloud Platform data center, or the like. Cloud-based system 103 is accessible via mobile device 104 and web-based system 105. In one embodiment, mobile device 104 includes a mobile device, such as an Apple iOS based device, including iPhones, iPads, or iPods, or an Android based device, like a Samsung Galaxy smartphone, a tablet, or the like. Any such mobile device includes an application program or app running on a processor. Web-based system 105 can be any computing device capable of running a Web browser, such as for example, a Windows™ PC or tablet, Mac Computer, or the like. Web-based system 105 may provide access to information or marketing materials of a system operations for new or potential users. In addition, Web-based system 105 may also optionally provide access to users via a software program or application similar to the mobile app further described below. In one embodiment, system 100 may also include one or more auxiliary camera modules 106. For example, one or more camera modules on a user's home, vacation home, or place of business. Auxiliary camera module 106 may be implemented as a client device 101 and operate the same way. In one embodiment, auxiliary camera module 106 is a version of client device 101 with a subset of components and functionality. For example, in one embodiment, auxiliary camera module 106 is a single camera client device 101.

Client device 101 is connected to cloud-based system 103 via connection 107. In one embodiment, connection 107 is a cellular-based wireless packet data connection, such as a 3G, 4G, LTE, 5G, or similar connection. Connections 108a-108c between other system components and cloud-based system 103 are Internet-based connections, either wired or wireless. For example, in one embodiment, mobile device 104 may at different times connect to cloud-based system 103 via Wi-Fi (i.e., any IEEE 802.11-based connection or similar technology) and cellular data (e.g., using 4G, LTE, or the like). In one embodiment, Web-based system 105 is connected to cloud-based system 103 over the World Wide Web using a wired Internet connection, such as DSL, cable modem, or the like. Similarly, in one embodiment, auxiliary camera module 106 is connected to cloud-based system 103 via a Wi-Fi connection to a home router connected to the Internet via cable modem, DSL, or the like. Any combination of available connections can be used to connect any of the system components to cloud-based system 103 via the Internet or similar networks.

Figure 2:
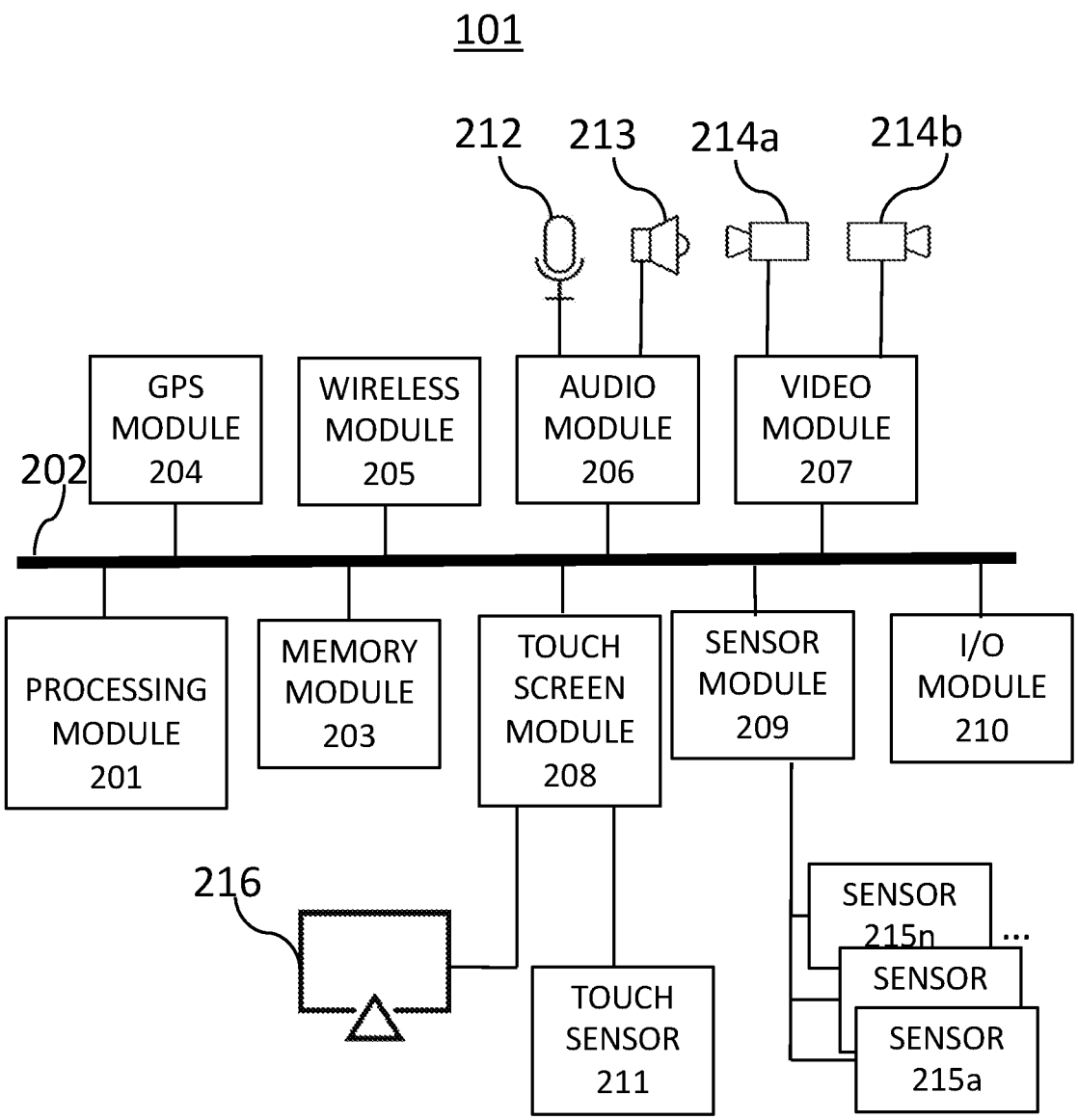
FIG. 2 is a functional block diagram of a client device according to embodiments of the disclosure.

Referring now to FIG. 2, a functional system diagram for a client device 101 according to one embodiment is shown. Different embodiments may include a subset of the components shown in FIG. 2 and/or other components not shown. In alternative embodiments, the components shown in FIG. 2 (as well as additional components not shown, such as for example, HDMI modules, battery charger and/or power supply modules, and the like) may be part of a System-on-Chip (SoC) device, multiple chips on a board, ASICs, or the like. The physical implementation of the components, either in silicon-based integrated circuits or software are left as a design choice of the person of ordinary skill in the art without departing from the invention. The client device 101 includes a microprocessor 201 connected to a data bus 202 and to a memory device 203 and additional functional modules. In one embodiment, microprocessor 201 is a Qualcomm Snapdragon MSM8953 but other microprocessors may be used to implement the invention, such as for example, other Qualcomm's Snapdragon processors, ARM Cortex A8/9 processors, Nvidia's Tegra processors, Texas Instruments OMAP processors, or the like. The microprocessor 201 executes operating system software, such as Linux, Android, iOS, or the like, firmware, drivers, and application software.

The client device 101 in this exemplary embodiment includes a location module 204, a wireless transceiver module 205, an audio I/O module 206, a video module 207, a touchscreen module 208, a sensor module 209, and an I/O module 216. In this embodiment, the different modules are implemented in hardware and software modules. In alternative embodiments, these modules can be hardware, software, or a combination of both. For example, alternative embodiments may be provided with one or more central processor ("CPU") cores on an SoC also including a wireless modem, multimedia processor, security and optionally other signal co-processors, such as for example, one or more graphics processor unit ("GPU") cores, one or more holographic processing unit ("HPU") cores, and/or one or more vision processing units ("VPU"). In one embodiment, one or more SoC processors used to embody the invention may encompass CPUs, GPUs, VPUs, HPUs, and other co-processors, motherboard buses, memory controllers, screen controllers, sound chipsets, camera modules, on-board memory, and several peripheral devices, including for example cellular, Wi-Fi, and Bluetooth transceivers, as further described below. Alternative embodiments include modules as discrete components on a circuit board interconnected by bus 202 or a combination of discrete components and one or more SoC modules with at least some of the functional modules built-in.

In one embodiment, location module 204 may include one or more satellite receivers to receive and decode signals from location satellite systems, such as Global Positioning System ("GPS"), Global Navigation Satellite System ("GLONASS"), and/or BeiDou satellite systems. In one embodiment, location module 204 is a Qualcomm QTR2965 or Qualcomm QGR7640 receiver that connects to a GPS antenna for receiving GPS satellite signals and providing geographical coordinates (latitude and longitude) of the location of the client device 101. The wireless transceiver module 205 includes a cellular modem, e.g., compliant with 3G/UMTS, 4G/LTE, 5G or similar wireless cellular standards, a Wi-Fi transceiver, e.g., compliant with IEEE 802.11 standards or similar wireless local area networking standards, and a Bluetooth transceiver, e.g., compliant with the IEEE 802.15 standards or similar short-range wireless communication standards. In one embodiment, the wireless transceiver module 205 is a Sierra Wireless HL-7588.

The audio I/O module 206 includes an audio codec chipset with one or more analog and/or digital audio input and output ports and one or more digital-to-analog converters and analog-to-digital converters and may include one or more filters, sample rate converters, mixers, multiplexers, and the like. For example, in one embodiment, a Qualcomm WCD9326 chipset is used, but alternative audio codecs may be used. In one embodiment, video module 207 includes a DSP core for video image processing with video accelerator hardware for processing various video compression formats and standards, including for example, MPEG-2, MPEG-4, H.264, H.265, and the like. In one embodiment, video module 207 is integrated into an SoC "multimedia processor" along with processor 201. For example, in one embodiment, client device 101 includes an integrated GPU inside the Qualcomm MSM8953 but alternative embodiments may include different implementations of video module 207.

In one embodiment, the touchscreen module 208, is a low-power touchscreen sensor integrated circuit with a capacitive touchscreen controller as is known in the art. Other embodiments may implement touchscreen module 208 with different components, such single touch sensors, multi-touch sensors, capacitive sensors, resistive sensors, and the like. In one embodiment, the touchscreen module 208 includes an LCD controller for controlling video output to the client device's LCD screen. For example, in one embodiment, touchscreen module 208 includes [actual device used for LCD control]. LCD controller may be integrated into a touchscreen module 208 or, in alternative embodiments, be provided as part of video module 207, as a separate module on its own, or distributed among various other modules.

In one embodiment, sensor module 209 includes controllers for multiple hardware and/or software-based sensors, including, accelerometers, gyroscopes, magnetometers, light sensors, gravity sensors, geomagnetic field sensors, linear acceleration sensors, rotation vector sensors, significant motion sensors, step counter sensors, step detector sensors, and the like. For example, in one embodiment, sensor module 209 is and Invensense ICM-20608. Alternative implementations of sensor module 209 may be provided in different embodiments. For example, in one embodiment, sensor module 209 is an integrated motion sensor MEMS device that includes one or more multi-axis accelerometers and one or more multi-axis gyroscopes. Client device 101 may also include one or more I/O modules 210. In one embodiment, I/O module 210 includes a Universal Serial Bus (USB) controller, a Controller Area Network (CAN bus) and/or a LIN (Local Interconnect Network) controller.

In one embodiment, client device 101 also includes a touchscreen 211. In alternative embodiments, other user input devices (not shown) may be used, such a keyboard, mouse, stylus, or the like. Touchscreen 211 may be a capacitive touch array controlled by touchscreen module 208 to receive touch input from a user. Other touchscreen technology may be used in alternative embodiments of touchscreen 211, such as for example, force sensing touch screens, resistive touchscreens, electric-field tomography touch sensors, radio-frequency (RF) touch sensors, or the like. In addition, user input may be received through one or more microphones 212. In one embodiment, microphone 212 is a digital microphone connected to audio module 206 to receive user spoken input, such as user instructions or commands. Microphone 212 may also be used for other functions, such as user communications, audio component of video recordings, or the like. Client device may also include one or more audio output devices 213, such as speakers or speaker arrays. In alternative embodiments, audio output devices 213 may include other components, such as an automotive speaker system, headphones, stand-alone "smart" speakers, or the like.

Client device 101 can also include one or more cameras 214, one or more sensors 215, and a screen 216. In one embodiment, client device 101 includes two cameras 214a and 214b. Each camera 214 is a high definition CMOS-based imaging sensor camera capable of recording video one or more video modes, including for example high-definition formats, such as 1440p, 1080p, 720p, and/or ultra-high-definition formats, such as 2K (e.g., 2048×1080 or similar), 4K or 2160p, 2540p, 4000p, 8K or 4320p, or similar video modes. Cameras 214 record video using variable frame rates, such for example, frame rates between 1 and 300 frames per second. For example, in one embodiment cameras 214a and 214b are Omnivision OV-4688 cameras. Alternative cameras 214 may be provided in different embodiments capable of recording video in any combinations of these and other video modes. For example, other CMOS sensors or CCD image sensors may be used. Cameras 214 are controlled by video module 207 to record video input as further described below. A single client device 101 may include multiple cameras to cover different views and angles. For example, in a vehicle-based system, client device 101 may include a front camera, side cameras, back cameras, inside cameras, etc.

Figure 3:
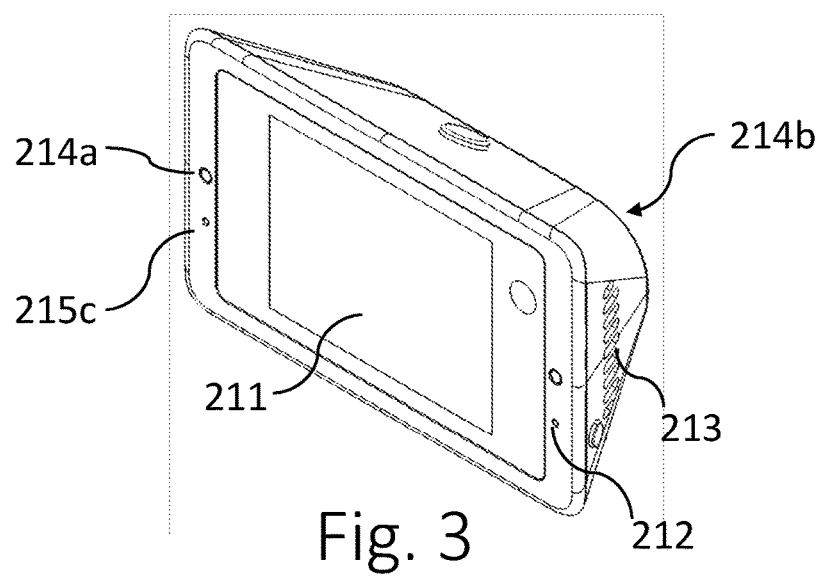
FIG. 3 is a block diagram of a dash camera client device according to embodiments.

Client device 101 can include one or more sensors 215. For example, sensors 215 may include one or more hardware and/or software-based sensors, including, accelerometers, gyroscopes, magnetometers, light sensors, gravity sensors, geomagnetic field sensors, linear acceleration sensors, rotation vector sensors, significant motion sensors, step counter sensors, step detector sensors, and the like. In one embodiment, client device 101 includes an accelerometer 215a, gyroscope 215b, and light sensor 215c. FIG. 3, provides an illustrative embodiment of a client device implemented as a dash camera system according to the invention.

Referring back to FIG. 1, another component of system 100 is a mobile device 104. Mobile device 104 may be an Apple iOS based device, such as an iPhone, iPad, or iPod, or an Android based device, such as for example, a Samsung Galaxy smartphone, a tablet, a PDA, or the like. In one embodiment, mobile device 104 is a smartphone with one or more cameras, microphone, speakers, wireless communication capabilities, and sensors. For example, mobile device 104 may be an Apple iPhone 7. The wireless communication capabilities of mobile device 104 preferably include wireless local area networking communications, such as 802.11 compatible communications or Wi-Fi, short-range low-power wireless communications, such as 802.15 compatible communications or Bluetooth, and cellular communications (e.g., 4G/LTE, 5G, or the like). In addition, mobile device 104 preferably includes an application program or app running on a processor. One of ordinary skill in the art is familiar with mobile operating systems and mobile apps. Mobile apps are typically made available and distributed through electronic means, such as for example, via electronic "stores" such as the Apple App Store or the Google Play Store, or directly from apps providers via their own websites. It should be noted that mobile device app is not required for operation of the system, for example, camera device 101/108 may include a voice-enabled interface, a chat-bot interface, or the like. However, several embodiments include the use of a mobile app.

A mobile app on mobile device 101 provides a user interface to a user account on cloud system 103 and to client device 101. In one embodiment, mobile app includes functionality similar to auxiliary camera 106. For example, mobile app uses one or more cameras on mobile device 104 to record video events in accordance to one embodiment of the disclosure. The video recording, buffer management, and other methods and techniques described herein may be also incorporated into mobile app in one or more embodiments of the invention.

Figures 4A, 4B, 4C:
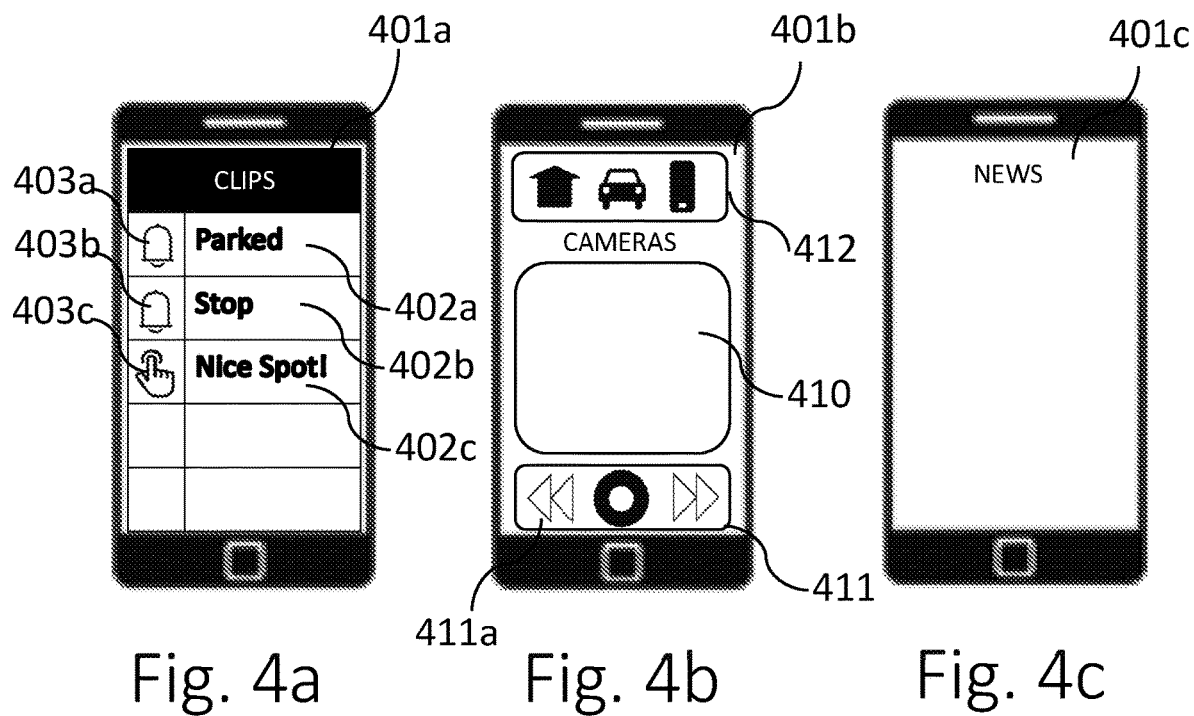
FIG. 4a shows a graphical user interface (GUI) for a "clips pane" in a mobile app in mobile device 104 according to one embodiment.
FIG. 4b shows a graphical user interface (GUI) for a "camera pane" in a mobile app in mobile device 104 according to one embodiment.
FIG. 4c shows a graphical user interface (GUI) for a "news pane" in a mobile app in mobile device 104 according to one embodiment.

Now referring to FIG. 4a-4c, a user interface for an app in mobile device 104 according to one embodiment is described. In one embodiment, the mobile app includes one or more panes 401. For example, FIG. 4a shows a graphical user interface (GUI) for a clips pane 401a in a mobile app in mobile device 104 according to one embodiment. The mobile app can receive video clips from multiple sources and store them locally. For example, video clips can be received from cloud system 103. Client devices 101, auxiliary cameras 106, and mobile devices 104 of the user and other users can upload video clips to cloud system 103. Video clips can also be directly sent to mobile device 104, for example from a client device 101 or an auxiliary camera 106. Video clips can also be locally generated on mobile device 104. In an alternative embodiment, only metadata for a clip is provided to the mobile app while the video data for the clip is stored remotely. For example, video data objects (such as for example files, data records, data objects, or the like) may be stored on cloud servers 102 or in local memory of client devices 101, auxiliary cameras 106, or other mobile devices 104 and remotely accessible over the Internet. According to one embodiment, one or more types video clips from one or more of these sources can be made available through the clips pane 401a of mobile app as illustrated in FIG. 4a. Clips pane 401a includes a listing of video clips that can be accessed by the user via mobile device 104. In one embodiment, clips are added to the clips pane 401a along with an alert to the user on the mobile device 104. For example, every time a clip is generated by a client device 101, client device causes a clip alert to be displayed to the user's mobile device 104 and the generated clip is listed on clips pane 401a available for access by the user. For each available video clip, a descriptor 402a-n and a clip type icon 403a-n are provided. In one embodiment, clip type icon 402 provides a visual indicator of the source of the video clip. For example, clip type icons 402a-b indicate that those clips were automatically generated via the auto-tagging method (as further described below) and clip type 402c indicates that that clip was user-generated. In additional embodiments, these and other clip types may be used. For example, in one embodiment, a multi-clip type icon may be used to indicate availability of multiple clips related to the same event, such as for example, multiple clips generated from different camera devices providing different viewpoints of the same event as further described below. Descriptors 402 provided text associated with the video clip, such as, for example, a user-generated description or an auto-tag descriptor as further described below. As one of ordinary skill in the art would understand, other icons 403 for different clip types and descriptors 402 may be used in a clips pane 401a in accordance with this disclosure. A user of the mobile app can cause mobile device to playback a video clip listed in the clips pane 401a by clicking on or touching the video clip listing on the clips pane 401a. The mobile app causes a media player, either built-in or provided through the operating system of the mobile device 104, to play the selected video clip.

According to one embodiment, live camera feeds from multiple sources can be displayed on the mobile device 104 through the camera pane 401b of mobile app as illustrated in FIG. 4b. In one embodiment, the camera pane 401b includes a camera feed window 410, a camera control interface 411 and a camera selection interface 412. Alternative embodiments may include a subset or additional elements in camera pane 401b. For example, camera selection interface 412 may be not included in a single-camera embodiment. Camera feed window 410 displays the video feed from the currently selected camera. Cameras may be selected using the camera selection interface 412. For example, camera selection interface 412 may display a selection option 412a-n for each of 1-n available cameras. In one embodiment, icons are used to depict each of the available cameras, such as a home camera (e.g., an auxiliary camera 105), a vehicle camera (e.g., from a client device 101), and a phone camera (e.g., the camera on the mobile device 106). Any number of additional cameras may be made available and the selection interface 412 modified to allow selection, such as via a drop-down menu, a pop-up "edit" menu, a picker menu, a rolling menu, or the like.

In one embodiment, real time camera feeds are provided to the mobile app with the same approach used for providing video clips based on a playlist file or manifest file as further described below. For real-time feeds, the playlist files are dynamically updated to include each newly generated video data object or file captured by the relevant camera. For each new video file, the file location is provided in the updated playlist and the playlist file is updated via the cloud system 103 or directly from the source of the video feed. For example, in one embodiment, playlist files for streaming video are dynamically updated as described in the HTTP Live Streaming specification (as for example described in Internet Draft draft-pantos-http-live-streaming-23 submitted by Apple, Inc. to IETF on May 22, 2017) incorporated herein by reference in its entirety. Alternative streaming techniques may be used in other embodiments, including, for example, MPEG-DASH (ISO/IEC 23009-1), Adobe's HTTP Dynamic Streaming, Microsoft's Smooth Streaming, or the like.

In one embodiment, camera pane 401b includes camera control elements 411. For example, a recording or manual tagging control element 411a is provided for the user to instruct the currently selected camera to generate a clip for the currently displayed video (as further described below). For example, if a user is involved in a video-clip-generating event, e.g., car accident, police stop, break-in, or the like, in addition to the any video clips generated through client device 101, either manually or automatically, mobile device 104 can also be used to generate additional video clips for the given event from a different angle or perspective. Further, in one embodiment, any time the mobile app is running on the mobile device 104, one or more cameras on the mobile device 104 are recording video data and manual tagging control element 411a is used to generate a manually-tagged video clip as further described below. Thus, mobile device 104 can be used as client device 101 or auxiliary camera device 106 according to this embodiment.

In one embodiment, camera pane 401b may also include additional control elements 411, such as, buttons, icons, or other selection elements or menus, to access non-live video stored in the buffer of the currently selected camera. For example, a user may remotely access an entire set of video data objects or files stored in the buffer of the user's client device 101 (e.g., video files for the preceding 24 hours) through user control elements 411. In one embodiment, based on the user input selecting a point in time from which to begin streaming buffered video, the source camera device (e.g., client 101, auxiliary camera 106, or other camera device) generates a dynamic playlist or manifest file including the video files for the next preset time period, for example, one minute, and it is progressively and dynamically updated in increments of same amount of time (e.g., every minute) with the next set of video files. The playlist or manifest files are generated as further described below with reference to video clip generation methods. Now referring to FIG. 4c, in one embodiment, a mobile app on mobile device 104 may also include a news pane 401c. News pane 401c provides information from a cloud service provider to users. In one embodiment, news pane 401c may provide the user with links to video clips on cloud service 103 that are related to video clips generated by the user's device or devices. For example, links to videos from nearby camera devices generated around the same time as an event video clip of the user (e.g., a car crash, break-in, or the like) and available from other users may be provided to the user on the news pane 401c. In one embodiment, requests for sharing a user's video clips may also be provided via news pane 401c as further described below.

As noted above, the features described above with respect to the mobile app may also be provided via Web-based system 105 using conventional website programming techniques to implement the functionality described for the mobile app.

Referring back to FIG. 1, the operation of client device 101 is described in more detail. Preferably, client device 101 includes two or more cameras 214. For example, in one embodiment, a first "IN" camera 214a is directed at the inside of a vehicle, i.e., the cabin, driver, and passengers, and a second "OUT" camera 214b is directed at the road in front of the vehicle. In alternative embodiments, additional cameras 214 may be used, for example facing the back and/or sides of the vehicle, multiple interior areas of the vehicle, one or more top camera with a wide-angle lens providing a 360° view around the vehicle, or the like.

According to one embodiment, client device 101 is always turned on as long as it has sufficient power to operate. Cameras 214a and 214b are always turned on and recording video. The video recorded by the cameras 214 is buffered in the memory device 203. In one embodiment, memory device 203 is configured as a circular buffer. For example, in one embodiment, memory device 203 may be a 32 Gb FLASH memory device. Client device 101 manages the buffer in memory device 203 to store video data for a predetermined and programmable set amount of time. For example, in one embodiment, memory device 203 buffers video data from two cameras 214a and 214b for the preceding 24 hours.

In one embodiment, client device 101 includes software to manage the cameras 214 to control the amount of data, e.g., bytes, generated by the cameras 214 and buffered in memory 203. In one embodiment, cameras 214 record data at various selectable video modes and rates. For example, cameras 214a and 214b can be set by client device 101 to capture video at various resolutions, including for example 1440p, 1080p, 720p, 360p, 240p, and the like. In addition, the frame rate for the video collected by each camera 214 can be set by client device 201. For example, in one embodiment, each camera 214 can independently change its video capture rate from 0 to 30 frames per second.

Figure 5:
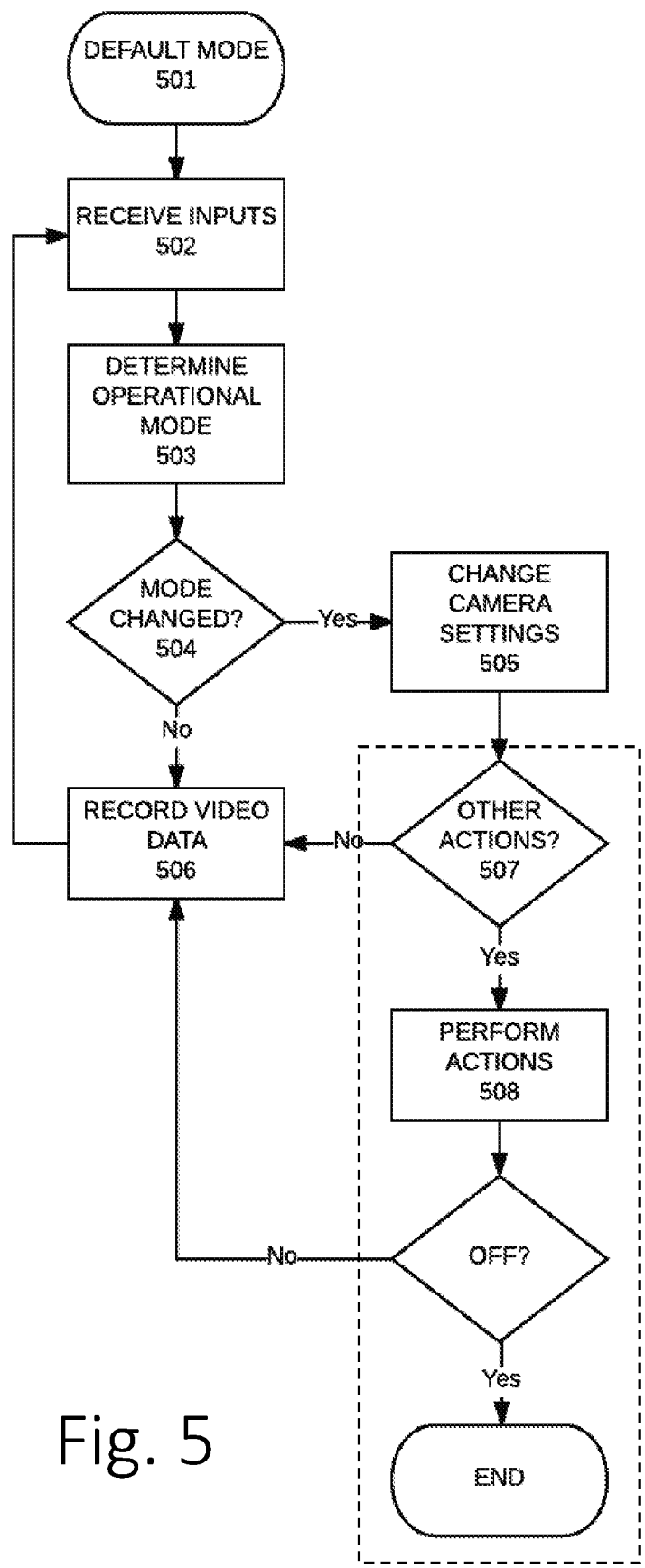
FIG. 5 is a flow chart illustrating a method of video data collection according to one embodiment.

Now referring to FIG. 5, a method for collecting video for managing video buffering according to one embodiment is described. In one embodiment, various inputs are used to change the resolution and frame rate for each available camera. Upon powering up, cameras are set to default recording settings 501. Multiple inputs are received 502 from various sources. For example, in one embodiment, processor 201 receives location and/or motion data from a location module 204, acceleration data from an accelerometer sensor 215a, vehicle status data, such as for example the revolutions per minute ("RPM") of a vehicle's engine, vehicle battery charge level, and the like, from I/O module 201 connected to a CAN bus, time from wireless module 205 (e.g., LTE network time), image processing inputs from video module 207 (e.g., face recognition, human body recognition, etc.), and the like. The inputs are used to determine the relevant features affecting the operation mode of the vehicle, such as for example, motion or lack of motion, presence of a user, presence of a person but not the user, or the like.

Based on the inputs received, an operational mode is determined 503. For example, the possible operational modes of a vehicle incorporating client device 101 according to one embodiment may include: default, driving, recently parked, parked, armed, low battery, and very low battery. Different embodiments can provide a subset or additional modes of operation, which may also vary depending on the vehicle or other location where the client device 101 (or auxiliary camera) may be located. Table 1 provides an exemplary set of inputs to define each status of a vehicle according to one embodiment. As one of ordinary skill in the art will appreciate different operational modes and different inputs can be provided without departing from the scope of the invention.

TABLE 1

| Operational Mode | Inputs |
|---|---|
| Default | n/a |
| Active | CAN bus door open and/or engine start, user Bluetooth ID detected. |
| Driving | Motion (from GPS, accelerometer, and CAN bus indicates RPM > 0) |
| Recently Parked | No motion and engine off for >3 and <5 minutes |
| Parked | No motion and engine off for >5 minutes |
| Armed | Face or body detected (but not recognized), accelerometer motion detected |
| Low Battery | No motion, CAN bus (Battery level) below threshold. |
| Very Low Battery | CAN bus (Battery Level) below second threshold |

A status change is determined at step 504. For example, after powering up, input data is received and the operational mode is no longer in "Default" mode. Based on the determined operational mode, the camera settings (e.g., resolution and frame rate) are changed 505 to produce more or less data for the video being recorded. For example, Table 2 provides exemplary camera settings for a two-camera client device 101 in a vehicle with an "IN" camera 214a and "OUT" camera 214b according to one embodiment. As one of ordinary skill in the art will appreciate, different settings for different numbers of cameras and operational modes can be provided without departing from the scope of the invention.

TABLE 2

| Operational Mode | OUT Camera Settings | IN Camera Settings |
| --- | --- | --- |
| Default | 720p, 15 fps | 720p, 15 fps |
| Active | 720p, 30 fps | 720p, 30 fps |
| Driving | 1440p, 30 fps | 1080p, 30 fps |
| Recently Parked | 720p, 30 fps | 720p, 15 fps |
| Parked | 720p, 15 fps | 360p, 15 fps |
| Armed | 1440p, 30 fps | 1440p, 30 fps |
| Low Battery | 240p, 1 fps | 240p, 1 fps |
| Very Low Battery | Off | Off |

Once the camera settings have been changed, recording of the video is done 506 using the camera settings. This results in video data objects, records, or files of varying size to manage the buffer, storing higher quality data with more bits during operational modes with higher likelihood of capturing video for events of interest while using lower quality data with less bits during operational modes with lower likelihood of capturing video of interest.

In an alternative embodiment, as illustrated in FIG. 5, additional actions may be associated with the various operational modes. In this embodiment, the method checks 507 if the operational mode requires additional actions. If so, the actions are performed at step 508. For example, in one embodiment, upon determining the "Low Battery" mode, client device 101 sends a notification to the user, for example via the app on the mobile device, a text message, an email, or the like. As another example, if the "Very Low Battery" mode is determined, the system may send as similar user notification and then turn off. Similarly, a "Buffer Size Limit" mode may be determined if the amount of data generated within the given time period (e.g., 24 hours) is going to exceed the size of the buffer and the system may have to rewrite over stored video data before the time period expires, for example, if the system is being used for extended periods of time. In that case, in addition to reducing the camera settings, the system may also send a notification to the user. As one of ordinary skill in the art will understand, different actions may be associated with different modes to provide additional functionality to the system within the scope of the invention. If one of the actions does not turn off the system, then recording can continue at step 506 as described above.

According to another aspect of one embodiment, the buffer management methodology used in client device 101 will optimize the memory available for buffering to ensure that video data is not stored on the memory device for longer than a preset, programmable amount time. For example, if the buffering time is set to 24 hours, client device 101 may change the camera settings to change the size of the video data objects or files to ensure that "stale" video data is written over by new video data as the 24-hour limit approaches. For example, in one embodiment, even if the vehicle operational mode is determined to be "Parked," processor 201 may over-write the mode to the camera settings associated with the "Driving" mode to ensure that older video data is written over in the circular buffer. In the case where even when using the highest quality video and maximum frame rate available some of the video data in the buffer remains after 24 hours, the system deletes the video data.

According to another aspect of the invention, in one embodiment, the buffer management methodology further includes a learning function to further optimize the storage of video data in the device's buffer memory. According to one embodiment, the camera device monitors the use of the camera device and creates history of use data for further application to buffer management algorithms. For example, in one embodiment, the times when each mode is activated and for how long each mode is activated is recorded. The buffer management methodology then uses the mode history information to optimize use of the buffer and/or to avoid buffer overrun. For example, the percentage of the buffer used within the current 24-hour timeframe and the expected use for remaining time based on history information is considered at the camera settings changing step 505 to reduce or increase camera quality settings for a given mode. For example, after determining that the Driving mode should be set at the $20^{th}$ hour of a 24-hour period, the method further checks the percent usage of the buffer and determines to have excess capacity, e.g., at 50% when historically it would be at 80%, and determines based on historical use data that for the next 4 hours of the 24-hour period it is expected to use 20% of the buffer. Since the buffer is being underutilized, the method increases the quality of video data for the Driving mode, for example, to 1440p/30 fps for both cameras.

In another embodiment, a vehicle-mounted client device 101 includes a learning algorithm for buffer management that learns the user's typical schedule for driving and corresponding modes (morning commute, parked until noon, lunch "drive", after noon "parked", etc.) and considers the expected use of the buffer at each given time. In this embodiment, if one day there are some unusual events causing modes that require higher quality camera settings earlier in the 24-hour period, later in the day the camera settings of lower quality settings modes, e.g., Parked mode, can be further reduced to lower resolution and frame rate than the normal settings for that mode. Alternatively, direct user input may also be provided to indicate a change in the typical operation schedule. For example, the user may indicate the use of the system for an extended road trip and the user input is used to override the expected schedule for that time frame.

According to another aspect of the invention, in one embodiment, the buffer usage history data learned by the system is further input to the operational mode determination step 503. In this embodiment, a weighting function is used to determine a probability for each operating mode based on the strength of the combination of inputs. For example, if the GPS input indicates no motion but the CAN bus input indicates some RPM, the confidence of the motion component for the mode determination is lower than if both the GPS and the CAN bus inputs both indicate no motion. Similarly, a face recognition positive input would increase the probability of the mode being "Driving Mode." Optionally, the confidence level of any image recognition input is also use as a weighting factor for the mode determination. For example, the confidence or likelihood of a positive image recognition match (e.g., the likelihood of a positive recognition of a face, the user's face, a body, a uniform, flashing lights, etc.) is used as a multiplier to the contribution of the match to the mode determination. The determination of the operating mode is set if the various probabilities from the multiple inputs exceed a threshold. In one embodiment, the mode probability thresholds are changed based on historical buffer usage data. For example, if the buffer storage is above the expected usage level for a given time within the buffer storage period (e.g., 24 hours), a higher threshold is used to determine a mode that uses higher definition/frame rate. Conversely, if the buffer storage is underutilized based on the historical use data, the mode threshold for the same modes can be reduced.

Figure 6A:
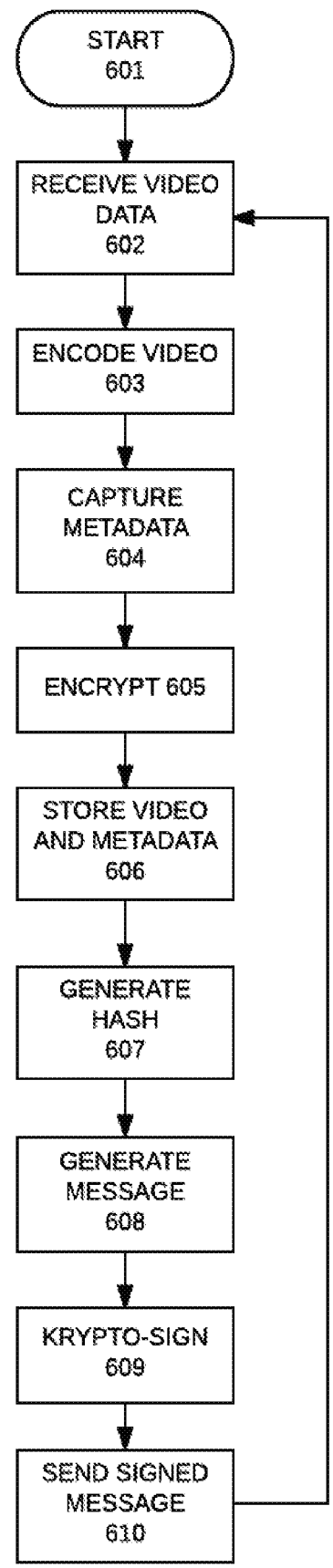
FIG. 6a a flow chart illustrating a method for cloud-based data collection and analysis of event-based data according to one embodiment.

Now referring to FIG. 6*a*, a method for capturing and storing video according to one embodiment is provided. As noted above, video cameras in the various devices are preferably always on and recording video. Once video is being recorded, the method beings 601 and continues until the device is turned off or, in the case of a mobile device 104, until the mobile app stops running. For each camera, the image sensor generates video data according to the camera settings for the current operational mode as described above with reference to FIG. 5. The video data is received 602 and the video for each preset time period is encoded 603 according to a video compression and encoding standard, such as for example, MPEG-4, H.264, H.265, or any other video compression and encoding standard. The time period for each block of video may be predetermined or variable (e.g., based on user settings) and may be, for example, 2, 4, 6, or 10 seconds. In one embodiment, every two seconds of video is encoded together into a video data object, record, or file. Other embodiments may use different time periods depending, for example, on the intended use of the video, the purpose for the system, the location where the system is deployed, the amount of memory available, the processing power available, or other relevant factors. Metadata for the same time period is also captured 604 as information associated with the captured video data. As part of the metadata capture 604, a globally unique ID ("GUID") is generated to uniquely identify the video data and metadata for the time period.

In one embodiment, the video data is encrypted 605. Any encryption algorithm may be used, such as, for example encryption algorithms compliant with the Advanced Encryption Standard (AES), Blowfish, Twofish, Data Encryption Standard (DES) (e.g., Triple-DES), RSA, or the like. Preferably, the video data is encrypted 605 based on a user-specific encryption key. In a vehicle-based embodiment, an encryption key is provided for each driver authorized to drive the vehicle. For example, in this embodiment, a biometric input from the driver is required to operate the system, such as, a fingerprint recognition, a voice recognition, or a face recognition based identification is used to identify the authorized driver. For each authorized driver, a corresponding randomly generated encryption key is maintained in a data table. Any video generated while the authorized driver is determined to be driving the vehicle is encrypted 605 using the driver-specific key. Subsequently, in order to provide privacy, only the authorized driver can provide access the encrypted video using biometric identification.

In another embodiment, video encryption 605 is based on other forms of user identification. For example, in one embodiment, the Bluetooth ID for the mobile device 104 of an authorized user is used for identification. In this embodiment, for example, a client device 101 may display the picture or pictures of the users for which the client device 101 has recognized the presence of their associated Bluetooth IDs. The recognized user who is driving can select his or her picture on the screen on the client device 101 and the corresponding encryption key is used for encrypting video. Alternative approaches for selecting the encryption key may be used in other embodiments. For example, a hierarchical level of authorized users may be provided, such as, an owner level versus a guest level or a parent level versus a child level, such that the encryption key for the highest level of authorized user recognized is used to encrypt the video in situations where multiple authorized users are detected. Alternatively, in some embodiments, the encryption 605 may not be user-based. For example, the encryption key may be a random key that is unique to each device. Moreover, is some embodiments the system may record video in un-encrypted form omitting step 605.

According to another aspect of the invention, several other privacy measures may optionally be provided for passengers of a vehicle with a camera device in one embodiment. For example, for ride-sharing applications, customer/passengers may want to protect their privacy from information capture by client device 101. In this embodiment, a ride-sharing mobile device app provides privacy features customizable by the user. Upon detection of the user/customer in the vehicle, client device 101 retrieves privacy settings for the detected passenger and applies them accordingly. For example, using face recognition, Bluetooth Id, or other means of recognizing the passenger, ride-sharing passengers' preferences may be applied on client device 101, such as turning certain cameras on or off, blurring video or parts of the video (e.g., faces), storing more or less of the sensor data collected, and/or enabling or disabling other features of the client device 101. In one embodiment, customers' qualifications may be required to provide access to customizable preferences, which may be accessible in different tiers, for example based on continued usage of the ride-sharing service (e.g., loyalty points/levels), payment levels, or the like.

Figure 12:
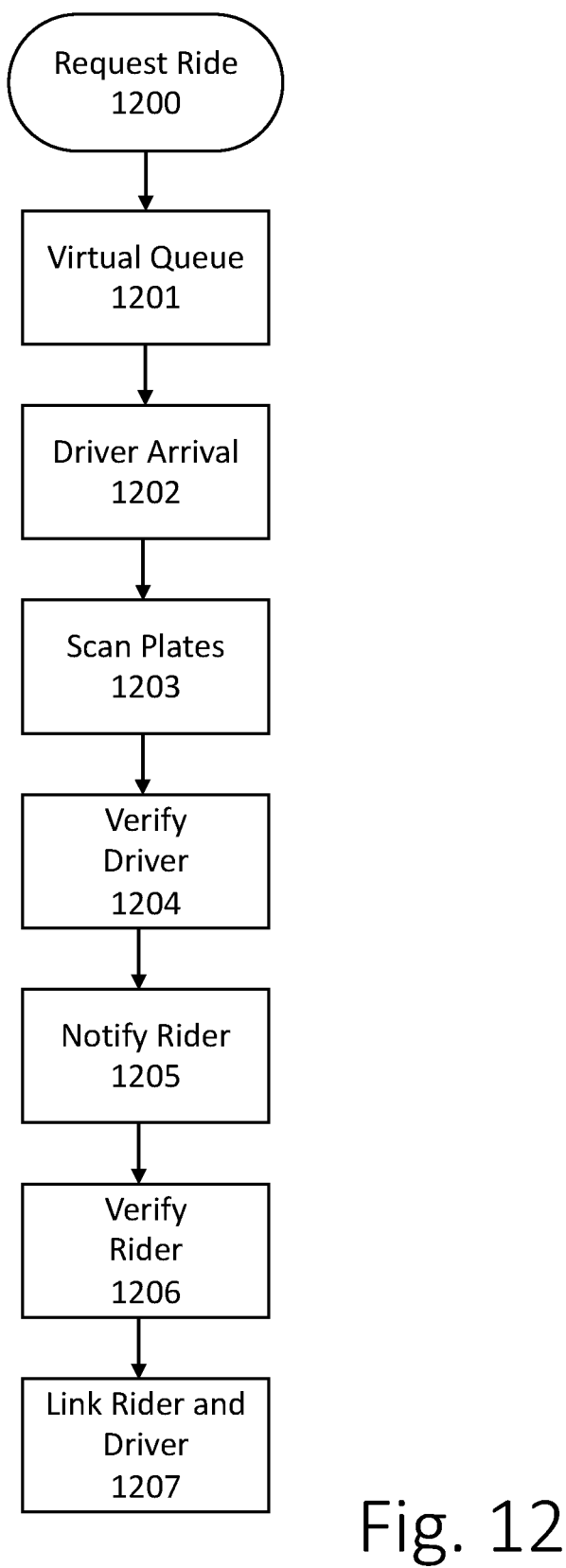
FIG. 12 is a flow chart illustrating a method for ride sharing service rider pick-up according to embodiments.

Referring now to FIG. 12, according to yet another embodiment, a rideshare communication method is provided which helps better connect a rideshare driver with a rideshare rider at the point of pickup. According to this embodiment, the process begins with a rider using a rideshare application on their smartphone to request a ride 1200, for example, from inside a business location. In one embodiment, the rideshare application may use GPS location information to instruct the rider to wait at a specific location nearby, such as a "Smart Stop" (which is a predefined area at a business or other location that is reserved for people waiting to be picked up by a rideshare service vehicle). The rideshare application then places the customer into a virtual queue 1201, while the request is being responded to by a driver in the system. While in the virtual queue, the system may store information from both the rider and the driver who accepts the request. When the driver arrives at the pickup location, the driver client device sends an arrival notification 1202 to the system. At this time, cameras located in the pickup area scan license plate information 1203 of any arriving vehicle, to confirm arrival of the driver. The plate scanning cameras may be any type of client device 101, including auxiliary camera modules 106, for example, fixed to poles, structures, or buildings in or around the pick-up location, mobile device 104 cameras of other riders, in-vehicle client devices 101 from other drivers, or the like. Once the driver vehicle plate is detected, the system links with the client device 101 located in the driver's vehicle to verify 1204, through facial recognition, that the current driver matches the rideshare driver profile information in the system. If the driver is verified 1204, then the rider receives notification 1205 through the rideshare application, or another supporting application, that the rideshare vehicle has arrived and that the driver has been verified. The rider is then asked to submit to a facial scan, for example, in one embodiment, the driver is asked to point a mobile device 104 camera to his or her face. In another embodiment, the rider is asked to stand in front of an auxiliary camera 106 provided at the pick up location for a facial scan. The system verifies 1204 the rider, using facial recognition to confirm that the rider's profile stored by the system matches his or her face. The system then notifies the driver that the rider is present. In one embodiment, the driver and rider are then linked 1207 by, for example, sending a picture of the driver to the rider and a picture of the rider is to the driver so that both people can more easily locate each other. Alternatively, a picture of the vehicle can also be provided. According to another embodiment, the rideshare driver's client device 101 will perform as an augmented reality device wherein a graphic box, for example, or any other graphic is displayed on to display 216 along with a real-time image of a field of view of a front facing camera 214, such as an image of several people waiting on a curb. With this arrangement, the exact location of the awaiting rider is determined, for example, using local RF beacons identifying the mobile device 101 of the rider (e.g., via Bluetooth ID), using facial recognition from a plurality of client device cameras at the pick-up location to triangulate the location of the rider, using facial recognition from the driver's front-facing camera 214 to identify the scanned face of the rider in the crowd, or using a similarly suitable approach. The rider exact location is then used to position a graphic above or over the rider as viewed through the augmented reality display 216. According to yet another embodiment of the invention, a secondary display located within the driver's vehicle and facing out automatically displays a picture of the rider when the driver arrives at the pick-up location. With this arrangement, the rider waiting on the curb can see his or her own picture and can thereby quickly and accurately determine that the arriving rideshare vehicle is meant for him or her. The picture can be from the rider's profile that is provided during initial setup of the rideshare account, or when the rider schedules a pick up, or at some other time.

Referring back to the method of FIG. 6a, the encrypted video data and associated metadata for the given time period are stored 606 in the buffer. The resulting video data object or file will be of varying size based on the camera settings (e.g., resolution, frame rate, etc.) applied as well as any other factors, such as applied compression format and encoding. The video data object is then hashed 607 using a one-way hash function, such as SHA, MD5, or similar algorithm, to generate a unique hash for the captured video, i.e., the video data hash. Optionally, the hashing function may be applied to a file that includes both the video data and metadata. Alternatively, the metadata may be stored separately but in association with the video data and it is not included in the generation of the hash 607.

In one embodiment, a message is generated 608 including the metadata for each time period and the corresponding video data hash. Preferably, the message is then cryptographically signed 609 to guarantee the message payload originates from an authorized device. For example, a private key associated with a system-authorized device may be used to generate a one-way hash of the message payload. In an alternative embodiment, the private key is used to encrypt the payload of the message. In one embodiment, each client device 101, auxiliary camera 106, and mobile device 104, is associated with a unique cryptographic key-pair. The device securely stores the private key. The cloud system 103 retains access to the public keys for each device so it can verify that messages it receives come from authorized devices. For example, cloud system 103 maintains a set of records uniquely associating a device ID for each authorized device in the system with a corresponding public key that is applied to messages received from the device. For example, private-public-key cryptographic signature methodologies may be used to verify that each received message includes a signature or encrypted payload encrypted with a private key from an authorized device.

In yet another embodiment, at step 607, optionally, instead of hashing the video data object, the client device uses its private cryptographic key to cryptographically sign or otherwise encrypt the video data object itself, for example, if the actual video data object is to be sent or otherwise uploaded to another device, such as cloud system 103. This could optionally be done in conjunction with step 609 as described above.

Finally, the message is sent 610 to the cloud system. Preferably, the message is sent using a secured connection, such as for example, an SSL/HTTPS connection over TCP/IP or the like. The process then repeats for the video data and metadata captured in the subsequent time period. Preferably, the time required to perform the process of FIG. 6a is less than the selected time period. For example, a device capturing video data in two-second increments (the time period) sends the metadata and video hash message to the cloud system 103 every two seconds. If at some point the data connection to the cloud is interrupted or otherwise becomes unavailable, the system may locally cache the messages for transmission upon reconnection to the cloud system 103.

In an alternative embodiment, the message signing step 609 is omitted. Instead, a device establishes a secured connection with the cloud system 103, such as an SSL/HTTPS connection, and authenticates itself to the server 102. For example, a device provides its device ID and a cryptographically signed version of its device ID, signed with the device's private key. The server 102 retrieves the public key corresponding to the device ID provided and verifies the signed device ID for a match. Upon authorization, the server provides the device with a session token that uniquely identifies communications from that device for a given session. Thereafter messages are sent 610 over the secured connection with the metadata and video hash and also including the server-provided token.

Now referring to FIG. 6b, a data model for capturing metadata associated with a given video data object or file is provided according to one embodiment. In one embodiment, the video-object metadata 620 is periodically sent to cloud system 103 as device telemetry information. In one embodiment, the telemetry information 620 is sent after the recording of each video object, e.g., every 2 seconds, 6 seconds, 8 seconds, 10 seconds, or the like. The video-object metadata 620 may include one or more metadata items including, for example, a device ID 621, an atomic clock time stamp 622, a GPS timestamp 623, a latitude value 624, a longitude value 625, an altitude 626, a speed 627, a compass heading 628, a horizontal accuracy value 629, a vertical accuracy value 630, a software version 631, a location string value (e.g., a "geohash") 632, a connection type identifier (e.g., 2G, 3G, 4G, WiFi, etc.) 633, a wireless signal strength value 634, and/or a carrier identifier 635. One of ordinary skill in the art would understand that any combination of these metadata values may be used depending on the implementation and intended use of the metadata.

Now referring to FIG. 6c, a data model for capturing metadata associated with a given event-based video clip, such as an automatically generated video clip, a user-generated video clip, or the like, is provided according to one embodiment. In one embodiment, the event metadata 650 is generated and stored with each video clip. The event metadata 650 may include one or more metadata items including, for example, device ID 651, an atomic clock time stamp 652, a location string value (e.g., geohash) 653, an event or tag type 654, an event or tag type 655, an event or tag title 656, an event or tag latitude value 657, an event or tag longitude value 658, an event or tag altitude 659, an event or tag speed 660, an event or tag compass heading 661, an event or tag horizontal accuracy value 662, an event or tag vertical accuracy value 663, the full file name for the an event or tag clip file (e.g., manifest file) 664, a software version 665, a device type ID 664, and one or more Boolean variables to indicate whether the event or tag clip has been viewed 665a, shared 665b, deleted 665c, etc.

Figure 7:
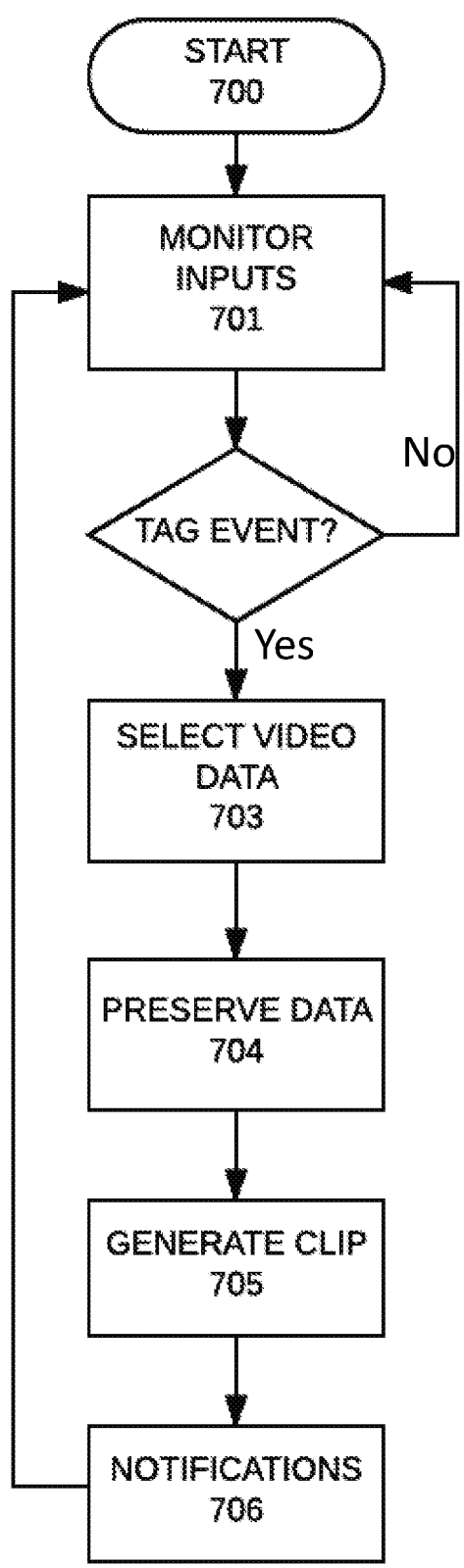
FIG. 7 is a flow chart illustrating a method for generating event-based video clips according to embodiments.

Now referring to FIG. 7, a method for generating event-based video clips according to one embodiment is described. Upon activation of the system, the method starts 700. The various inputs are monitored 701 while video is continuously captured. If no tagging event is detected 702, the system keeps monitoring. If a tagging event is detected 702, the relevant video data in the buffer is identified and selected 703. For example, once an event is detected 702, the video files for a predefined period of time before and after the event is identified in the buffer. In one example, 15 seconds before and after the event time is used. The amount of time, preferably between 10 and 30 seconds, may be pre-programmed or user selectable. Further, two different time periods may be used, one for time before the event and the other for time after the event. In one embodiment, the time periods may be different depending on the event detected. For example, for some events the time periods may be 30 seconds before event and 1 or 2 minutes after while other events may be 15 seconds before and 15 seconds after.

The selected video data is marked for buffering 704 for a longer period of time. For example, the video files for the selected time period are copied over to a second system buffer with a different buffering policy that retains the video for a longer period of time. In one embodiment, the selected video data being in a buffer storing video for 24 hours is moved over to a second buffer storing video for 72 hours.

Referring back to FIG. 7, a video clip is then generated 705 with the selected video data. Like every video data object, every video clip generated is associated with a globally unique identifier (GUID). In one embodiment, video clips are generated using a playlist file or manifest file as is known in the art. Each playlist or manifest file includes a GUID. For example, in one embodiment, an m3u8 playlist file is generated according to the HTTP Live Streaming specification (as for example described in Internet Draft draft-pantos-http-live-streaming-23 submitted by Apple, Inc. to IETF on May 22, 2017). Alternative video clip generating techniques may be used in other embodiments, including, for example, MPEG-DASH (ISO/IEC 23009-1), Adobe's HTTP Dynamic Streaming, Microsoft's Smooth Streaming, or the like. The playlist or manifest file provides network-based location for the video data objects selected 703. For example, a Universal Resource Locator (URLs) may be provided for each of a set of video files. Using this approach, the video data can be stored in any network accessible storage. For example, video files identified in a given playlist can be stored on a camera device (e.g., client device 101, auxiliary camera 106, or mobile device 104) and network address locators are provided for each file at that location. In alternative embodiments, other video clip generation approaches may be used. For example, in one embodiment, the selected 703 video data is used to generate a single video file, such as an MPEG video file, that may be uploaded and downloaded as needed.

In one embodiment, video data objects are stored on the network-accessible buffer of the camera device and the playlist or manifest files for the generated event-based video clips identify the network addresses for the memory buffer memory locations storing the video data objects or files. Alternatively, upon identifying and selecting 703 the relevant video data objects, in addition to or as an alternative to moving the video data to the longer buffer 704, the video data may be uploaded to the cloud system 103. The clip generation 705 then identifies in the playlist or manifest file the network addresses for the video data stored in the cloud system 103. A combination of these approaches may be used depending on storage capacity and network capabilities for the camera devices used in the system or according to other design choices of the various possible implementations.

In one embodiment, other system components, such as the cloud system 103 or mobile device 104, are notified 706 of the event or event-based video clip. For example, in one embodiment a message including the GUID for the generated video clip is sent to the cloud system in a cryptographically signed message (as discussed above). Optionally, the playlist or manifest file may also be sent in the message. In one embodiment, the playlist or manifest files are maintained in the local memory of the camera device until requested. For example, upon notification 706 of the clip generation, the cloud system may request the clip playlist or manifest file. Optionally, the cloud system may notify 706 other system components and/or other users of the clip and other system components or users may request the clip either from the cloud system 103 or directly from the camera device. For example, the clips pane 401a in the user's mobile app may display the clip information upon receiving the notification 706. Given that the clip metadata is not a large amount of data, e.g., a few kilobytes, the user app can be notified almost instantaneously after the tag event is generated. The larger amount of data associated with the video data for the clip can be transferred later, for example, via the cloud system or directly to the mobile device. For example, upon detection of a "Baby/Animal in Parked Car" event or a "Location Discontinuity" event, the user's mobile device 104 may be immediately notified of the tag event using only tag metadata. Subsequently, the user can use the video clip playlist to access the video data stored remotely, for example, for verification purposes.

Once a video clip is generated 705, it may be shared with other devices owned by the same user or, if authorized, the video clip may be shared with other users of the system. For example, the GUIDs for every video clip generated by a camera device of a given user may be stored in a user clip table in the cloud system 103. For example, GUIDs for the clips from all the cameras on a multi-camera client device 101, for the clips from any auxiliary camera device 106, and for the clips generated by the mobile app on the user's mobile device 104, may all be stored in the user clip table. The user may access the user clip table via mobile device 104. For example, mobile app may maintain a user clip table that is synchronized with the user clip table in the cloud system. Every time a new clip notification is received, the mobile app and cloud-based user clip tables are updated and or synchronized. Alternative synchronization approaches may be used, such as for example a periodic synchronization approach.

In addition to the GUID, in one embodiment, the user clip tables may also include other information or metadata for each clip of the user, such as for example, a name or descriptor, device ID where the video was captured, time and date information, tag or event information, thumbprint images, or the like. Further, the playlist or manifest file may also be stored or identified in the user clip table. In one embodiment, a user may access video clips through the mobile app on the mobile device 104 through the clip pane 401a. Upon selection of a clip through the clip pane 401a, the mobile app uses the clip GUID to request the corresponding playlist or manifest file from the cloud system 103, directly from a camera device (e.g., client device 101 or auxiliary camera 106). Using the playlist or manifest file, the mobile app can playback the video clip by requesting the relevant video objects using their network address identifiers. In one embodiment, if the video data objects are encrypted, the user may provide an identification (e.g., biometric ID, face recognition, user ID and password, or the like) to access the decryption key as further discussed above.

According to one embodiment, video clips generated by devices registered under the same user account are automatically shared with the user. According to another aspect of the disclosure, a user may also share video clips with other users through the system or using other Internet messaging or connectivity. For example, in one embodiment, mobile app on mobile device 104 (or website on Web-based system 105) includes functionality to link or publish video clips to social media sites or networks, such as Facebook, Twitter, Google Plus, or other sites from social networking platforms. Video clips can also be shared directly via email, text messaging, or similar electronic communication approaches, or otherwise exported to other computer systems. In one embodiment, cloud system 103 stores video data for a given video clip in a publicly accessible network storage location. Cloud system 103 may be accessed via the Internet by anyone with an event-based video clip playlist or manifest file as is known in the art. A user may share the playlist or manifest file, either directly or via a network link, such as a URL, to the playlist or manifest file stored on an Internet-accessible storage location, for example, on cloud system 103 or any other similar location.

According to another aspect of the disclosure, video clips may also be shared automatically with other users of the system. For example, upon joining the system, the user may be presented with a number of options to pre-authorize the sharing of the user's video clips with other users of the system. In one embodiment, users have the option to pre-authorize access to video clips generated by certain camera devices. For example, the user may authorize the sharing of video clips generated with video data captured by an "OUT" camera on a vehicle-based system. Optionally, the user may impose restrictions on the video clips that are shared with other users. For example, a user may only allow sharing of video clips of a certain video quality, with or without sound, or the like. For example, a user may authorize the sharing of video clips from an "IN" camera in a vehicle-based system but without any audio. Optionally, another option for pre-authorization of access to a user's video clips may be based on location. For example, the user may pre-authorize access to video clips generated by a "home" auxiliary camera 106 to other users registered in locations within a pre-defined radius, e.g., neighbors. The location of camera devices that are part of the system can be identified by IP address lookup, GPS location (e.g., from a smartphone device, client device, or the like) or my manual entry of location. Any time a new user joins, the location of the user (e.g., a home address, preferred location, or the like) is used to determine nearby existing users. For example, in one embodiment, the distance between every pair of users is calculated and maintained in a database and a pre-defined radius or distance limit is applied to designate which users are "nearby" with respect to other users, for example by adding a flag to user's whose pairwise distances are below the pre-defined radius. In one embodiment, during the sign-in process, the system sends a consent request to existing users to share with the new users. Alternatively, in another embodiment, upon signing on to the system, every user pre-authorizes the sharing of at least some camera-specific video with "neighbors" or "nearby" users. Additionally, the user may be allowed to provide additional restrictions with respect to the video clips that may be shared with neighbors. According to another aspect of the video clip sharing functionality, users may mark individual video clip with a sharing designation. In one embodiment, this sharing designation would overwrite any other pre-authorization, such that a user would have control of which video clips may be shared and which ones may not. Additional techniques for sharing video clips are further discussed below, such as for example, accessing of shared neighbors' video via Web-based system 105 or mobile device 104.

According to another aspect of the disclosure, detection of tagging events 702 may be done automatically by the system. For example, based on the monitored inputs, in different embodiments events such as a vehicle crash, a police stop, or a break in, may be automatically determined. The monitored inputs 701 may include, for example, image processing signals, sound processing signals, sensor processing signals, speech processing signals, in any combination. In one embodiment, image processing signals includes face recognition algorithms, body recognition algorithms, and/or object/pattern detection algorithms applied to the video data from one or more cameras. For example, the face of the user may be recognized being inside a vehicle. As another example, flashing lights from police, fire, or other emergency vehicles may be detected in the video data. Another image processing algorithm detects the presence of human faces (but not of a recognized user), human bodies, or uniformed personnel in the video data. Similarly, sound processing signals may be based on audio recorded by one or more microphones 212 in a camera device, (e.g., client device 101, auxiliary camera 106, or mobile device 104). In one embodiment sound processing may be based on analysis of sound patterns or signatures of audio clips transformed to the frequency domain. For example, upon detection of a sound above a minimum threshold level (e.g., a preset number of decibels), the relevant sound signal is recorded and a Fast Fourier Transform (FFT) is performed on the recorded time-domain audio signal as is known in the art. The frequency-domain signature of the recorded audio signal is then compared to known frequency domain signatures for recognized events, such as, glass breaking, police sirens, etc. to determine if there is a match. For example, in one embodiment, pairs of points in the frequency domain signature of the recorded audio input are determined and the ratio between the selected points are compared to the ratios between similar points in the audio signatures of recognized audio events.

Sound processing may also include speech recognition and natural language processing to recognize human speech, words, and/or commands. For example, certain "trigger" words may be associated with particular events. When the "trigger" word is found present in the audio data, the corresponding event may be determined. Similarly, the outputs of the available sensors may be received and processed to determine presence of patterns associated with events. For example, GPS signals, accelerator signals, gyroscope signals, magnetometer signals, and the like may be received and analyzed to detect the presence of events. In one embodiment, additional data received via wireless module 205, such as traffic information, weather information, police reports, or the like, is also used in the detection process. The detection process 702 applies algorithms and heuristics that associate combinations of all these potential inputs with possible events.

The following Table 3 provides exemplary inputs, rules, and heuristics for corresponding events according to one embodiment of the invention in a vehicle implementation. While a set of specific examples is provided, it is understood that the present invention can be applied to a wide variety of inputs, rules, and heuristics that can identify other possible events, depending on the application.

TABLE 3

| Inputs, Rules, and Heuristics | Possible Event |
| --- | --- |
| Sound "IN" camera above threshold and close match to glass breaking sound signature<br>GPS - no motion<br>Accelerometer - small vibrations<br>CAN bus - engine off<br>IN camera - object motion detected or unrecognized face detected<br>No authorized user Bluetooth ID | Break-in/Burglar |
| GPS - location in a freeway or highway - stop after speed above posted limit<br>Traffic data - no slowdown/heavy traffic reported<br>Accelerometer - small vibrations<br>CAN bus - low RPM (idle) or off<br>IN camera - flashing lights detected/police vehicle detected/uniformed personnel detected<br>OUT camera - road shoulder detected/police vehicle detected/uniformed personnel detected<br>Sound - sirens detected | Police Stop |
| GPS - no current motion<br>Accelerometer - threshold deceleration exceeded<br>Gyroscope - threshold angular acceleration exceeded<br>Sound - specific "distressed words" identified/loud crashing sounds detected | Accident/Car Crash |
| GPS - no current motion<br>Accelerometer - minor motion or no motion (Recently Parked Mode)<br>Sound - possible animal sounds or baby crying<br>Image recognition IN camera - possible optical flow indication of movement inside vehicle or human/baby face recognition | Baby/Animal left in parked vehicle |
| Prior GPS reading indicating location exceeding a maximus distance from current location upon power up<br>Time gap from last operation exceeding maximum time limit | Location Discontinuity (vehicle transported/stolen) |

These combinations of events and inputs are illustrative only. Some embodiments may provide a subset of these inputs and/or events. Other embodiments may provide different combinations of inputs and/or different events. The event detection algorithms may be implemented locally on the camera device (e.g., client device 101) or may be performed in cloud servers 102, with the input signals and event detection outputs transmitted over the wireless communication connection 107/108 from and to the camera device. Alternatively, in some embodiments a subset of the detection algorithms may be performed locally on the camera device while other detection algorithms are performed on cloud servers 102, depending for example, on the processing capabilities available on the client device. Further, in one embodiment, artificial intelligence ("AI") algorithms are applied to the multiple inputs to identify the most likely matching event for the given combination of inputs. For example, a neural network may be trained with the set of inputs used by the system to recognize the set of possible tagging events. Further, a feedback mechanism may be provided to the user via the mobile app to accept or reject proposed tagging results to further refine the neural network as the system is used. This provides a refinement process that improves the performance of the system over time. At the same time, the system is capable of learning to detect false positives provided by the algorithms and heuristics and may refine them to avoid incorrectly tagging events.

Referring back to FIG. 5, in one embodiment, upon detection 702 of an event, determination of operational mode 503 sets the operational mode to a high-quality settings mode, such as "Armed" or the like. Alternatively, an "Event" operational mode may be provided that may cause a camera settings change 505, to a high-quality setting, such as, for example 1440p and 30 fps for all cameras.

According to another aspect of the disclosure, in one embodiment, the detection process 702 is configured to detect a user-determined manual tagging of an event. The user may provide an indication to the system of the occurrence of an event of interest to the user. For example, in one embodiment, a user may touch the touchscreen of a client device 101 to indicate the occurrence of an event. Upon detecting 702 the user "manual tag" input, the system creates an event-based clip as described above with reference to FIG. 7. In an alternative embodiment, the user indication may include a voice command, a Bluetooth transmitted signal, or the like. For example, in one embodiment, a user may utter a predetermined word or set of words (e.g., "Owl make a note"). Upon detecting the utterance in the audio input, the system may provide a cue to indicate the recognition. For example, the client device 101 may beep, vibrate, or output speech to indicate recognition of a manual tag. Optionally, additional user speech may be input to provide a name or descriptor for the event-based video clip resulting for the user manual tag input. For example, a short description of the event may be uttered by the user. The user's utterance is processed by a speech-to-text algorithm and the resulting text is stored as metadata associated with the video clip. For example, in one embodiment, the name or descriptor provided by the user may be displayed on the mobile app as the clip descriptor 402 in the clips pane 401a of the mobile app. In another embodiment, the additional user speech may include additional commands. For example, the user may indicate the length of the event for which the manual tag was indicated, e.g., "short" for a 30-second recording, "long" for a two-minute recording, or the like. Optionally, the length of any video clip can be extended based on user input. For example, after an initial event-based video clip is generated, the user may review the video clip and request additional time before or after and the associated video data is added to the playlist or manifest file as described with reference to FIG. 7.

In one embodiment, the tagging process may optionally be programmable. For example, camera device may be programmed to recognize traffic signs using image recognition and a classifier and to capture and store metadata associated with the recognized sign. For example, stop signs may be detected and the speed or other sensor data may be recorded as metadata associated with the stop sign. This feature may be used by third-parties for monitoring driving behavior. For example, parents can monitor children, insurance companies can monitor insureds, employers can monitor employees, etc. Optionally, in one embodiment the camera device may provide driver feedback based on the detected signs and sensor data. For example, in one embodiment, the camera device may recognize street parking signs and notify the user regarding parking limits. For example, the device may alert the user regarding a "No Parking" zone, a limited time parking zone, and/or remind the user prior to the expiration of a parking time limit with sufficient time for the user to return to the vehicle (e.g., based on the sign image recognition, time, and location information). One of ordinary skill in the art would recognize the additional applications of driver feedback are possible within the scope of the invention, such as for example, feedback regarding speeding, traffic light/sign compliance, safety, or the like. According to another embodiment of the invention, client device 101 preferably includes two or more cameras 214, one directed inside the cabin of the vehicle 214a and one directed outside 214b. According to this embodiment, object recognition software running on client device 101 will continuously analyze recorded video of inside the vehicle for various reasons, including detection of a lit cigarette or cigar. The software will search for the tell-tale signature of a smoker, by first identifying the general features of the human face of each person in the vehicle, and then search for a small bright illuminated circle located near the person's mouth, which would illuminate brightly for less than about 5 seconds. The bright glowing circle would be an indication that a person is inhaling a cigarette, for example, which would cause the lit end of the cigarette to glow with increased intensity owing to the temporary increase in the flow of oxygen. Client device 101 (or another separate device) may include a thermal sensor 215 that is dedicated to identify such "hot spots" within a vehicle which, if found, would likely indicate that a person is smoking inside the vehicle.

If it is determined that a person is smoking the vehicle, an alarm may sound, and/or a record of such an event would be recorded and preferably also transmitted to the remote cloud system 103. This smoker-detection feature can be used for example, in ride sharing services to verify that smoke-free vehicles are provided, or for example, in the car-rental industry (and other agencies and companies that use fleets of vehicles in their operation) wherein it is important to keep track of when a person driving or riding in one of their vehicles is or has smoked while in the vehicle In another embodiment, the programmable tagging may be accessed remotely, e.g., via cellular communications module 205, to provide image queries remotely. For example, in one embodiment, license plate and/or car image queries associated with an "Amber Alert" may be provided by authorities via cloud system 103 to all camera devices in the system. According to one embodiment, standard "definitions" of image queries can be shared amongst cameras ahead of time so that all cameras can be looking for a specific object or item. Optionally, the image queries may include a timing component to specified an amount of time during which camera devices may periodically run the image query. For example, an Amber Alert may provide one or more image queries (e.g., a license plate and/or a specific vehicle brand and/or color) to be searched for some amount of time, for example during 24 hours. Optionally, in one embodiment, the user may also provide programmable tagging instructions, for example via mobile device app or Web-based interface. For example, in one embodiment, the user may schedule a tag generation event for capturing video data at a particular time, or may remotely instruct the camera device to start recording on command.

Figure 8:
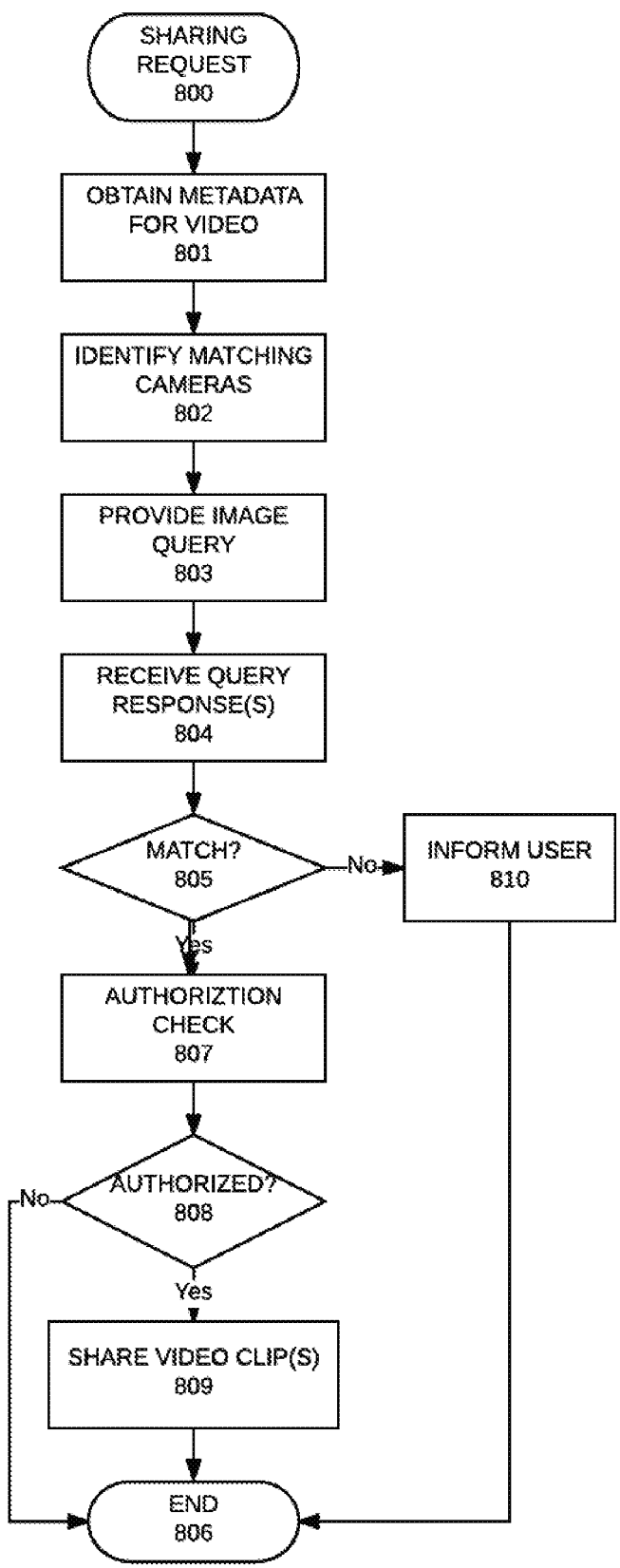
FIG. 8 is a flow chart illustrating a method for sharing event-based video according to embodiments.

Now referring to FIG. 8, a method for identifying and sharing event-based video clips is described. In addition to the various options for sharing video clips identified above, in one embodiment, video clips may also be shared based on their potential relevance to events generated by different camera devices. To do so, in one embodiment, a video clip sharing request is received 800. The video clip sharing request 800 may be user-generated or automatically generated. For example, in one embodiment, a map can be accessed displaying the location of camera devices for which a user may request shared access. The user can select the camera device or devices it wants to request video from. In an alternative embodiment, the user enters a location, date, and time for which video is desired to generate a sharing request.

In yet another embodiment, a user may select an object (e.g., a car, person, item, or the like) being displayed on the screen of a camera device. For example, via a tap on a touchscreen of a client device 101 while video is being played, using voice commands, or other user input device capable of identifying objects being displayed on a video. Optionally, an object of interest can also be identified on a video automatically. For example, as part of the auto-tagging feature described above with reference to FIG. 7, some of the inputs monitored 701 may include objects of interest resulting from image processing techniques. For example, if a tagging-event is determined to be a break-in and one of the monitored inputs includes a detected human face that is not recognized, the unrecognized face may be used as the selected object.

Image processing algorithms and/or computer vision techniques are applied to identify the selected object from the video and formulate an object descriptor query. For example, the user input is applied to detect the region of interest in the image, e.g., the zoomed-in region. The data for the relevant region is processed into a vector representation for image data around detected relevant points in the mage region. From the vector or descriptor of the relevant region, feature descriptors are then extracted based on, for example, second-order statistics, parametric models, coefficients obtained from an image transform, or a combination of these approaches. The feature-based representation of the object in the image is then used as a query for matching in other video data. In one embodiment, a request for sharing video clips includes an image query for an object and metadata from the video data in which the object was detected.

Referring back to FIG. 8, in one embodiment, upon receiving the sharing request 800, from the metadata provided with the request, the relevant metadata for sharing video clips from other camera devices is obtained 801. For example, in one embodiment, the request may include the location, date and time for the desired video. In another embodiment, the GUID of the video data object from which the object was detected. Using the GUID, the metadata file for that video data object is obtained 801 and metadata for that video object is accessed. For example, a cloud system 103 stores the metadata for all the video data objects in the system. The metadata may be indexed by the GUIDs of the video objects. In an alternative embodiment, the request for sharing video clips includes relevant items of metadata from the video object in which the object of interest was found. For example, the request may include a location (e.g., geo-coordinates, GPS data, or the like), a camera orientation (e.g., a magnetometer reading), and time (e.g., atomic time data from a 4G/LTE system) from the camera device that recorded the video data.

Using the obtained metadata values, a set of relevant camera devices with video data responsive to the request, that for example may include the same object of interest or match the desired location, date, time, and/or orientation, is identified 802. In one embodiment, to respond to an image-query-based request, camera devices located within a given geographical radius at a given time frame and with cameras pointing in a desired orientation may be first identified 802. For example, if the object of interest is an unrecognized face detected inside a vehicle parked in a parking lot, camera devices from other vehicles in the same parking lot at the same time and directed at the vehicle that was broken into at the right time may be identified 802. Optionally, once the relevant camera devices are identified 802, a request for an image search query with the query for the object of interest is sent 803. The camera devices receiving this request can search their buffered video data with the image search query provided to determine if there is a match. In one embodiment, the feature vectors for the object of interest and compared with feature vectors for potentially relevant objects identified in the video data to determine if there is a match. For example, if the object of interest is a human face, a face feature vector is provided with the query and camera devices can use image processing to identify faces in the video data, extract feature vectors for the identified faces, and compare to the face feature vector of the desired face. Optionally, the search request may provide a time frame of interest to further reduce the buffered video objects that need to be analyzed to respond to the request. In one embodiment, the cloud system 103 monitors the user object selection process to identify selection of the same object by multiple users. Upon determining that multiple users have selected the same object, generating the same or a substantially similar image query, the system may, for example, notify the users via news pane 401c of other users with similar interests. The object query may be additionally matched based on location (e.g., same object identified by users within a maximum distance), time, and/or event type.

Responses to the search request are received 804. If no matches are found 805, the sharing request process ends 806. For example, if the search request was initiated by a user, the user may be notified that no matching video clips were found. If matching video clips are found 805, an authorization request is sent 807 to the user of the camera device responding with a match. As discussed above with reference to FIG. 4a-c, the clips generated from camera devices of the user may be listed under the clips pane 401a. Thus, the user may access clips generated 705 from a client device 101, an auxiliary camera 106, a mobile device 104, without further authorization requirement. For example, in one embodiment, when the camera devices with video clips matching the same event, such as a break-in, are registered to the same user account, the user may directly access the shared video clips from one or more home auxiliary cameras 106 that captured the same break-in as the dash-mounted client device 101 from different vantage points. Thus, for example, a user may be able to provide related video clips to the authorities showing a perpetrator's face (from an IN-camera device), a "get-away" vehicle from an auxiliary home camera device located in a carport, and a license plate for the get-away vehicle from a driveway auxiliary camera device. The video clips for the break-in event could be automatically generated and associated as "related" clips from multiple camera devices integrated by the system according to one embodiment of the invention.

In one embodiment, the authorization request may include a dynamically generated video clip for the user to review in determining whether to authorize the sharing of the video clip with other users. In one embodiment, the authorization request may be fulfilled automatically based on pre-authorization recorded during sign-on, e.g., for neighbors, for specific cameras, or the like. Alternatively, the authorization request is fulfilled by other users. For example, a playlist or manifest file may be included with the request allowing the authorizing user to playback the relevant video objects with the matching object. As noted above, the video objects can be accessed directly from the camera device buffer, for example via the Internet or a direct network connection (e.g., Wi-Fi) between a mobile device and the camera device. In addition, if the video objects are encrypted, the authorization request may include a user identification request to obtain the required encryption key, such as for example, a biometric identification (e.g., face recognition, fingerprint, or the like). With the appropriate encryption key, the video objects are decrypted and playback to the user to obtain authorization for sharing. In addition, in one embodiment, the user may optionally request the system to obfuscate identified objects in the shared video clip. For example, any human faces, license plates, address numbers, and/or any other identifiable objects selected by the user may be automatically blurred in the video data to protect privacy upon user request. Alternatively, the system may by default obfuscate identifiable objects unless otherwise requested and/or authorized by system users.

If sharing authorization 808 cannot be obtained, the sharing request terminates 806, by for example notifying a user requesting the sharing that no clips are available. If authorization is obtained 808, for every matching video clip for which authorization is obtained is shared 809 with other users. For example, in one embodiment, if the sharing request was initiated by a user, the requesting user is notified of the availability of matching video clips. For example, the mobile app of the requesting user's mobile device 104 receives a notification from cloud system 103 and provide the notification to the user via the mobile app user interface. If the sharing request was automatically generated by a camera device of a user, for example from an auto-tagging event, the mobile app in the mobile device 104 of the user receives a notification of the availability of other video clips relevant to the user. The mobile app may then display information regarding the available video clips on the news pane 401c. Optionally, the mobile app may directly link the available video clips to the event-generated clips on the clips pane 401a. Any video clips for encrypted video data would have been decrypted through the authorization process and thus become shared video clips in unencrypted form.

In one embodiment, the video sharing request process is used to generate a virtual network of distributed cameras recording video for an event of interest. For example, the video clip generation process may include a live-stream playlist or manifest file dynamically generated and updated with additional clips being recorded for the given event. Using this approach, the system may generate a set of associated video clips for a given event, such as for example, a break-in, car accident, or the like, captured from cameras in the dynamically generated virtual network to provide views from different angles, vantage points, and/or wider or narrower views. For example, in one embodiment, interspersed still images from video captured by multiple camera devices may be used for license plate recognition purposes where video from a single camera is insufficient. In one embodiment, in addition to the license plate or if unable to recognize the license plate the color and make and model of the vehicle may be determined based on classifier-based image recognition techniques. The video sharing process of FIG. 8 is continuously run adding and removing camera devices to the virtual network as necessary. For example, if the event is a car accident on a freeway, vehicle-mounted client devices 101 with the proper orientation (i.e., facing the accident) are dynamically added and removed from the virtual network based on their location, time, and orientation match, i.e., near the accident and facing it, and failure to match, after passing the accident location.

Figure 9:
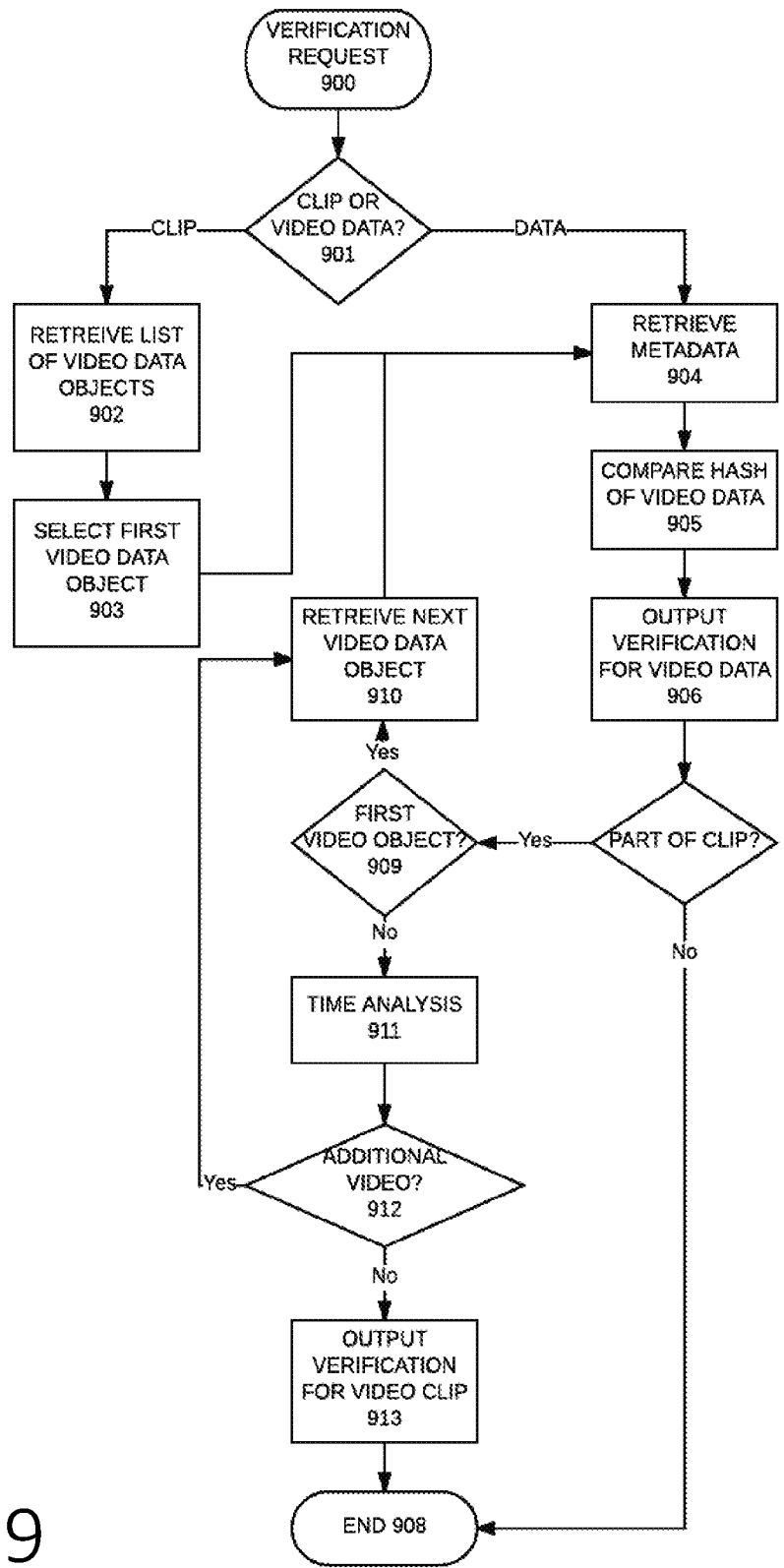
FIG. 9 is a flow chart illustrating a method for verifying authenticity of event-based video data files according to embodiments.

According to another aspect of the disclosure, the video data generated by the camera devices in the system may be uniquely identifiable and verifiable to be authentic and unmodified. Now referring to FIG. 9, an exemplary method for verifying authenticity of video data according to one embodiment is described. In this embodiment, both video data objects and video clips may be authenticated. In alternative embodiments, either video data objects or video clips can be separately authenticated, or only one or the other may optionally be authenticated without departing from the teachings of this disclosure. The method begins with an authentication request 900. For example, a request to authenticate a video generated by a camera device associated with cloud system 103 may be submitted to a cloud server 102, via for example, a Web-based interface 105 to a system website. In one embodiment, a file is provided with the request. In one embodiment, a determination 901 is made as to whether the request is for a video clip or for a video data object, such as video file. This step may be omitted in alternative embodiments. The determination may be made, for example, based on the type of file submitted (e.g., a playlist or manifest file or a video data file), based on the GUID associated with the file (e.g., a GUID for a video clip or a GUID for a video data object), or based on other criteria, such as for example, an explicit input provided in the request.

In one embodiment, if the request is determined 901 to be for a video clip, the playlist or manifest file for the video clip is accessed to retrieve 902 the list of video data objects or files in the video clip. The first video data object is selected 903. In one embodiment, if the request is determined 901 to be for a video data object, or if it is for a video clip and the first video data object has been selected 903, the metadata record associated with the video clip is retrieved 904. For example, in one embodiment, the GUID for the video data object is used to access a repository of metadata records associated with video data objects captured by camera devices associated with the cloud-based system 103. As described above, every camera device sends signed messages to the system including the metadata and a hash of the video data object for every data object recorded. In one embodiment, a metadata record includes the metadata and the hash of the video data and may be indexed by the associated GUID.

The stored hash of the video data object corresponding to the GUID is then compared 905 to a one-way hash of the video data object for which authentication is requested. In one embodiment, the authentication request includes the video data object. In that embodiment, the video data object is hashed using the same one-way hashing function used by the camera devices of the system. In an alternative embodiment, a network address for the video data object is provided in video clip file. In such an embodiment, the video data object is retrieved, for example at step 903 (or step 909 for subsequent video data objects), and it is hashed as described above. If the system is implemented based on hashing of the video data along with the metadata, the metadata retrieved 904 (if not part of the request) is used in the hashing function for the video data object being verified. The hashing function may be applied on a server, such as server 102, or may be performed on a client, such as Web-based client 105, and provided to the authentication system, for example along with the request.

In one embodiment, the result of the hash comparison 905 is used to output 906 a verification for the video data object. The verification output may, for example, provide a positive or negative result, indicating whether the video data is authentic or whether it has been modified. In one embodiment, the verification output may also include relevant metadata associated with the video data object, such as time, location, orientation, and the like. In one embodiment, if the video data object verified is not part of a video clip 907, the verification process concludes 908. However, if the video data object is part of a video clip 907, the process continues to step 909. At step 909, if the video data object that was verified was the first video data object in a video clip 909, the next video data object is selected 910 and the process repeats from step 904 for verification of the second video data object in the video clip. If the video data object is not the first in a video clip, a time analysis 911 is performed next. In one embodiment, as described above, the metadata for a video data object includes time information to identify when the video data was captured. For example, in one embodiment, atomic time from a 4G/LTE service provider is used to create a time stamp of the beginning of the video data object and either a duration or end stamp to indicate its end. In one embodiment, this time information is provided with the video object verification output 906, and used for time analysis 911. For example, the ending time of the first video data object in a clip is compared to the beginning time for the second video data object of the clip to determine if there is a gap. A gap in the time sequence between consecutive video data objects of a given video clip may for example indicate some editing to the video clip.

In one embodiment, if there are additional video data objects to be verified in a video clip 912, the process moves to step 910 and repeats through the time analysis step 911 for every video data object. Once all the video data objects in a video clip are verified 912, a video clip verification output is provided 913. For example, if all the video data objects in the clip were positively verified and the time analysis did not identify any gaps, a positive authentication for the video clip may be output 913. Optionally, the output may for example, include additional information regarding the video clip, such as, for example, time, duration, location, camera device used, user, or the like. Conversely, if any of the video clips cannot be authenticated, e.g., the hashes do not match, or a gap in the video clip timeline is found at step 911, a negative result is output 913. The output may for example, include reasons for the negative result in addition to or in place of any of the information provided for a positive result. For example, in one embodiment, a video clip consisting of 15 two-second video files generated upon detection of a car crash by a client device 101 could be uniquely verified as authentic by cloud system 103 using the approach described above.

Figure 10:
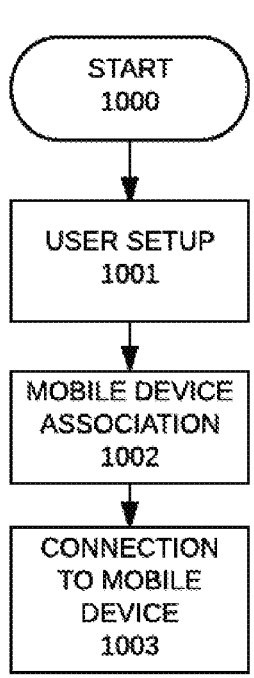
FIG. 10 is a flow chart illustrating a method for setting up a client device according to embodiments.

According to another aspect of the disclosure, a process for setting up a camera device, such as a client device 101, is provided. Referring to FIG. 10, a method for setting up a camera device for operation in the system according to one embodiment is described. In one embodiment, camera devices, such as client device 101, include cellular connectivity that is operational as soon as the device is powered up. Cellular connectivity provides a data connection 107/108 between the camera device and the cloud system 103 that can be used during the set-up process. When the camera device is powered up, the set-up process begins 1000. While the following set up steps are provided in order, no particular order is required for these steps. For example, in one embodiment, a user set up step 1001 is performed. In one embodiment, the user set up step 1001 allows the camera device to recognize the user. For example, in one embodiment, a client device 101 provides instructions to a user to pose in different orientations while facing one of the cameras to record different angles of the user's face. Optionally, a similar process may be used to recognize other user biometrics, including for example, fingerprints, voice, and irises. For example, a touch sensor may be used to record a series of images of a user's fingerprint. Voice recognition software may be trained by having the user repeat pre-defined commands, statements, or sentences one or more times. In one embodiment, a user's iris is recorded from multiple angles to derive a biometric optical signature. Other embodiments may include a combination of these biometrics identifications and may further include others.

The user's biometric signature or signatures are stored in the camera device. In one embodiment, a cryptographic key is also generated based on a random input and stored in association with the biometric identification of the user. Optionally, if more than one user is required, for example for a vehicle with multiple possible drivers, the user set up process 1001 is repeated for each user.

Referring back to FIG. 10, another set up step involves the association of the camera device with one or more mobile devices 104. It should be noted that mobile device 104 may itself be a camera device, and thus some of the set-up steps, such as user set up step 1001 may be applicable. Mobile device 104 includes a mobile app installed on the device as described above with reference to FIG. 4a-4c. In one embodiment, mobile device 104 and camera device (e.g., client device 101) include a short range wireless modules, such as Bluetooth transceivers. As is known in the art, short range wireless modules may transmit a unique ID that can be received by other short range wireless modules as a for of identification of devices in forming a piconet or otherwise pairing with each other. For example, Bluetooth transceivers can provide a unique 12-digit hexadecimal address ("BD_ADDR") for identification and pairing.

In one embodiment, a user may prompt the camera device to pair with the user's mobile device 104. For example, in one embodiment, the user may utter a voice pairing command, provide a pairing command through a touchscreen, or through any other user input device available in the camera device. In one embodiment, the pairing process involves a Bluetooth paring process. In another embodiment, the camera device displays a unique pattern that is captured by the mobile device and sent back to the camera device via the connection to the could system 103. For example, camera device may display a randomly generated alphanumeric code, a QR code, a series of black and white screens in a random order, or some other random output. The random output is captured or entered into the mobile device by the mobile app and transmitted via a secured Internet connection to cloud system 103 along with a unique identifier of the mobile device, such as, for example a Bluetooth address, a MAC address, or the like. The random output and the mobile device input are compared. If they match, the camera device authenticates the mobile device unique identifier (e.g., Bluetooth address or MAC address) and from that point on is associated with the mobile device. In an alternative embodiment, instead of comparing the output of the client device with the input captured by the mobile device, both devices generate an output that is compared at the server. For example, each device uses a camera to perform face recognition of the user during the set-up process and their face recognition results are sent to the server for comparison to match the same user.

In one embodiment, a QR code is displayed on the display of the client device 101. The QR code encodes a device ID for the client device 101 and an encryption key (or seed for generation of an encryption key) for communicating with the client device 101. The mobile app on the mobile device 104 captures and interprets the QR code to obtain the device ID and encryption key. The device ID may for example include a telephone number, email address, or other means for electronic messaging with the client device 101. Using the encryption key, the mobile device 104 can send encrypted communications to the client device 101 as further described below to associate the mobile device with the client device, including for example, sending to the client device 101 a unique identifier for the mobile device 104, for example, telephone number, email address, Bluetooth address, MAC address, or the like. While described with the client device 101 being the device that displays the QR code, the same approach may be used with the mobile device 104 displaying the QR code and the client device 101 initiating the encrypted messaging using the encryption key provided by the mobile device 104.

Figure 11:
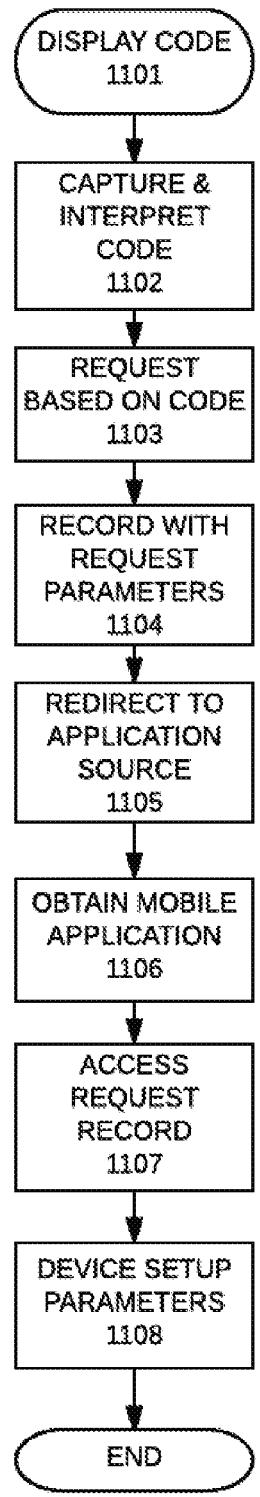
FIG. 11 is a flow chart illustrating a method for provisioning a mobile device with a mobile app according to embodiments.

Other "shared secret" approaches may be used for mobile device association 1002, include for example, a series of instructions to cause the user to move the mobile device while the mobile app records the outputs of one or more mobile device sensors to be matched with the provided instructions. For example, the user may raise or lower the device, shake the device, etc. in a random series causing accelerometer and/or gyroscope changes that match the requested motions. The series of sensor-detected motions can be provided via Internet connection for matching with the camera device instructions for association. Alternatively, in one embodiment, a user may provide a telephone number for the mobile device during a registration process, for example through the mobile device app. For the mobile device association step 1002, camera device may display a device ID on its screen. The user inputs the device ID on the mobile app and it is transmitted to the cloud system 103. The cloud system identifies the device ID and sends a message to the camera device 101/106 via Internet connection 107/108 including the telephone number for mobile device 104. The camera device sends a text message to mobile device 104 with a random code. The user inputs the random code via the mobile app for verification by cloud system 103 or camera device 101/106. If the random code matches the texted code, the mobile device is authenticated. Once the camera device and the mobile device are associated 1002, the camera device can trust the mobile device for subsequent interactions, based on a unique ID for the mobile device (e.g., Bluetooth address, MAC address, or the like). According to another aspect of disclosure, in one embodiment, the set-up process optionally includes the step of provisioning the mobile device 104 with a mobile app. FIG. 11 provides an exemplary flow diagram for an initial set-up process according to one embodiment. As described above, camera device 101/108 includes a wireless cellular connection to the Internet and is configured to communicate with cloud system 103 out of the box. When the camera device is first turned on, the screen displays a QR code 1101. A mobile device can use one of its existing apps to capture the QR code with its camera and interpret the code 1102. In this embodiment, the QR code provides a link or URL to a web-server, for example in cloud system 103. The link or URL may include an IP address or a domain (e.g., www.owl.us) and a set of parameters encoded therein as is known in the art. One of the parameters may include, for example, a unique ID for the camera device 101/108 being set up, such as for example, a mobile device number, a telephone number, a serial number, or the like. Optionally, the link parameters may also include a randomly generated number that is different for different times the set-up process is run. Alternatively, instead of displaying a QR code, the same process may be performed providing the link and parameters in alternative forms, including for example, by displaying them on the screen as text/image, encoding them in an audio signal, transmitting them via short range communication (IR, AirDrop, Bluetooth, etc.) or the like.

Upon interpreting the QR code, the mobile device uses its existing software (e.g., a web browser) to send 1103 an HTTP request to the web server identified through the link or URL and including the parameters encoded into the link. The cloud system 103 receives the request and creates 1104 a record for the request, including the link-encoded parameters and additional metadata and network information derived from the HTTP requesting process, including information for uniquely identifying the mobile device 104 (e.g., combination of HTTP heather metadata, TCP/IP header information, or the like). In addition, cloud system 103 redirects 1105 the mobile device to a location from where the appropriate mobile app may be obtained. For example, cloud system 103, using, for example, the "User-Agent" data from the HTTP request and/or the unique device ID for the camera device 101/108, redirects the mobile device 104 to either the Apple App Store when the User-Agent indicates the mobile device to be an iOS device or to the Google Play Store if the mobile device is determined to be an Android-based device or alternatively, to other servers capable of providing the mobile app to the mobile device over a network. Similarly, the cloud system 103 may include parameters in the redirection link to the appropriate version of the mobile app determined using the device ID of the camera device 101/108.

Once redirected, the mobile device 104 obtains 1106 the proper mobile app, e.g., the app for interaction with camera device 101/108 and cloud system 103. After the downloading and installation of the mobile app on mobile device, when executed, the mobile app contacts the cloud system 103 to access 1107 the record previously generated at step 1104. For example, the mobile app may derive a unique ID for the mobile device 104 using the same parameters, metadata, or other information available from the mobile device 104 when making an HTTP request like the one made at step 1103. In one embodiment, a time limit (e.g., 2-15 minutes) may be used between the HTTP request step 1103 and the record access step 1107 to facilitate the mobile device 104 identification. Cloud system 103 determines that the same mobile device 104 is accessing the system based on that information and provides 1108 access to the previously generated record and any other additional set up parameters that may be necessary to complete the set-up process. For example, if provided, the randomly generated number may be provided as a "shared secret" for the device association process described above. Alternatively, encryption information and/or messaging information for the camera device may be provided. Referring back to FIG. 10, another aspect of the disclosure involves setting up a direct connection between a camera device 101/108 and a mobile device 104. In one embodiment, camera device 101/108 includes wireless local area network connectivity. In this embodiment, for example, a client device 101 may optionally operate as an access point (AP) for a local area network, such as Wi-Fi network. The mobile device 104 can establish a connection 109 to the client device 101 as a Wi-Fi station (STA). While a specific wireless local area network connection is described, it is understood that the present invention can be applied to a wide variety of wireless connection modes, such as, for example, Peer-to-Peer connections (e.g., "Wi-Fi Direct, ad hoc network, or the like). The camera device can use the MAC address authenticated through a mobile device association process 1002 to determine whether the associated mobile device is the one making the connection. The direct camera device to mobile device connection 109 may then be used to transfer settings, video data objects, video clips, biometric signatures, and the like, in a secured way between the devices.

As those in the art will understand, a number of variations may be made in the disclosed embodiments, all without departing from the scope of the invention, which is defined solely by the appended claims. It should be noted that although the features and elements are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general-purpose computer or a processor.

Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. One or more processors in association with software in a computer-based system may be used to implement methods of video data collection, cloud-based data collection and analysis of event-based data, generating event-based video clips, sharing event-based video, verifying authenticity of event-based video data files, and setting up client devices according to various embodiments, as well as data models for capturing metadata associated with a given video data object or file or for capturing metadata associated with a given event-based video clip according to various embodiments, all of which improves the operation of the processor and its interactions with other components of a computer-based system. The camera devices according to various embodiments may be used in conjunction with modules, implemented in hardware and/or software, such as a cameras, a video camera module, a videophone, a speakerphone, a vibration device, a speaker, a microphone, a television transceiver, a hands free headset, a keyboard, a Bluetooth module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module, or the like.

What is claimed is:

1. A method for connecting a rideshare driver with a rideshare rider at a point of pickup, the method comprising:
   accessing rider information regarding a rideshare rider requesting a rideshare driver, the rider information comprising (i) rider location information indicating a pickup area comprising one or more camera devices and (ii) a rider facial recognition profile;
   receiving a request response from the rideshare driver, the rideshare driver being associated with a vehicle having a license plate and a driver face recognition profile;
   monitoring a location of the vehicle associated with the rideshare driver to determine an arrival at the pickup area;
   upon determining the arrival at the pickup area, scanning with the one or more camera devices license plate information from vehicles in the pickup area to confirm the license plate associated with the rideshare driver vehicle;
   upon confirming the license plate associated with the rideshare driver vehicle with the one or more cameras in the pickup area, verifying the rideshare driver using a second camera device within the rideshare driver vehicle and the face recognition profile of the rideshare driver;
   upon verifying the rideshare driver, notifying the rideshare rider that the rideshare driver has arrived at the pickup area;
   requesting a facial scan from the rideshare rider;
   verifying the rideshare rider based on the facial scan and the accessed rider facial recognition profile;
   upon verifying the rideshare rider, notifying the rideshare driver that the rideshare rider is present at the pickup area;
   linking the rideshare driver and the rideshare rider.

2. The method of claim 1, the one or more camera devices are auxiliary client devices of a cloud-based camera network.

3. The method of claim 1, wherein the second camera device is a client device of a cloud-based camera network.

4. The method of claim 3, wherein the client device comprises face recognition software.

5. The method of claim 3, wherein the client device further transmits an image of the face of the rideshare driver to the cloud-based system for comparison with the face recognition profile of the rideshare driver.

6. The method of claim 1, wherein the second camera device comprises a front-facing camera and an augmented reality display and wherein the linking the rideshare driver and the rideshare rider includes identifying the rideshare driver in a live video stream of the pickup area from the front-facing camera displayed in the augmented reality display.

7. The method of claim 1, wherein the rider location information includes information derived from one of RF beacons or face recognition information from images collected by the one or more camera devices in the pickup area.

8. The method of claim 1, wherein the rideshare driver vehicle comprises a secondary display facing out of the vehicle and further wherein the linking the rideshare driver and the rideshare rider includes displaying a picture of the rideshare rider on the secondary display.

9. The method of claim 1, wherein the facial scan requested from the rideshare rider is provided via the one or more camera devices in the pickup area.

10. The method of claim 1, wherein the facial scan requested from the rideshare rider is provided via a mobile app in a smartphone of the rideshare rider.

11. A system for connecting a rideshare driver with a rideshare rider at a point of pickup, the system comprising one or more processors and non-transitory computer readable media comprising instructions that when executed by the one or more processors configure the system to:
   access rider information regarding a rideshare rider requesting a rideshare driver, the rider information comprising (i) rider location information indicating a pickup area comprising one or more camera devices and (ii) a rider facial recognition profile;
   receive a request response from the rideshare driver, the rideshare driver being associated with a vehicle having a license plate and a driver face recognition profile;
   monitor a location of the vehicle associated with the rideshare driver to determine an arrival at the pickup area;
   upon determining the arrival at the pickup area, scan with the one or more camera devices license plate information from vehicles in the pickup area to confirm the license plate associated with the rideshare driver vehicle;
   upon confirming the license plate associated with the rideshare driver vehicle with the one or more cameras in the pickup area, verify the rideshare driver using a second camera device within the rideshare driver vehicle and the face recognition profile of the rideshare driver;
   upon verifying the rideshare driver, notify the rideshare rider that the rideshare driver has arrived at the pickup area;
   request a facial scan from the rideshare rider;
   verify the rideshare rider based on the facial scan and the accessed rider facial recognition profile;
   upon verifying the rideshare rider, notify the rideshare driver that the rideshare rider is present at the pickup area;
   link the rideshare driver and the rideshare rider.

12. The system of claim 11 further comprising the one or more camera devices in the pickup area, the one or more camera devices are auxiliary client devices of a cloud-based camera network.

13. The system of claim 11 further comprising the second camera device, wherein the second camera device is a client device of a cloud-based camera network.

14. The system of claim 13, wherein the client device comprises face recognition software.

15. The system of claim 13, wherein the client device further transmits an image of the face of the rideshare driver to the cloud-based system for comparison with the face recognition profile of the rideshare driver.

16. The system of claim 11 further comprising the second camera device, wherein the second camera device comprises a front-facing camera and an augmented reality display and further wherein the instructions that when executed by the one or more processors configure the system to link the rideshare driver and the rideshare rider further configure the system to identify the rideshare driver in a live video stream of the pickup area from the front-facing camera displayed in the augmented reality display.

17. The system of claim 11, wherein the rider location information includes information derived from one of RF beacons or face recognition information from images collected by the one or more camera devices in the pickup area.

18. The system of claim 11 wherein the rideshare driver vehicle comprises a secondary display facing out of the vehicle and further wherein the instructions that when executed by the one or more processors configure the system to link the rideshare driver and the rideshare rider further configure the system to display a picture of the rideshare rider on the secondary display.

19. The system of claim 11, wherein the facial scan requested from the rideshare rider is provided via the one or more camera devices in the pickup area.

20. The system of claim 11, wherein the facial scan requested from the rideshare rider is provided via a mobile app in a smartphone of the rideshare rider.

* * * * *